United States Patent
Nobori

(10) Patent No.: US 8,005,295 B2
(45) Date of Patent: Aug. 23, 2011

(54) APPARATUS AND METHOD FOR IMAGE PROCESSING, IMAGE PROCESSING PROGRAM AND IMAGE PROCESSOR

(75) Inventor: Kunio Nobori, Osaka (JP)

(73) Assignee: Panasonic Corporation, Osaka (JP)

( * ) Notice: Subject to any disclaimer, the term of this patent is extended or adjusted under 35 U.S.C. 154(b) by 624 days.

(21) Appl. No.: 12/278,845

(22) PCT Filed: Feb. 28, 2008

(86) PCT No.: PCT/JP2008/000386
§ 371 (c)(1), (2), (4) Date: Aug. 8, 2008

(87) PCT Pub. No.: WO2008/108071
PCT Pub. Date: Sep. 12, 2008

(65) Prior Publication Data
US 2010/0166299 A1    Jul. 1, 2010

(30) Foreign Application Priority Data
Mar. 6, 2007 (JP) ................ 2007-055533

(51) Int. Cl.
*G06K 9/00* (2006.01)
(52) U.S. Cl. ........ 382/162; 382/167; 382/169; 382/266; 382/267; 382/274; 358/1.9; 358/3.23
(58) Field of Classification Search .......... 382/162, 382/167, 141, 147, 151, 201, 169, 266, 267, 382/268, 274; 348/87, 95, 126, 349, 453; 358/1.9, 3.23, 518; 345/589, 590, 604, 605, 345/690, 204, 594
See application file for complete search history.

(56) References Cited

U.S. PATENT DOCUMENTS

| 5,706,419 A | 1/1998 | Matsugu et al. |
| 6,628,819 B1 | 9/2003 | Huang et al. |
| 7,065,245 B2 * | 6/2006 | Toda ............... 382/154 |

(Continued)

FOREIGN PATENT DOCUMENTS
JP    2676978    1/1992
(Continued)

OTHER PUBLICATIONS

Lucas et al.; "An Iterative Image Registration Technique with an Application to Stereo Vision," Proc 7$^{th}$ Int'l Joint Conf on Artificial Intelligence (IJCAI); Aug. 1981; pp. 674-679; p. 2 of the description.

(Continued)

*Primary Examiner* — Samir Ahmed
*Assistant Examiner* — Ali Bayat
(74) *Attorney, Agent, or Firm* — Renner, Otto, Boisselle & Sklar, LLP

(57) ABSTRACT

Corresponding points or a motion vector is generated with reduced positional error even if incoming images have been shot under different illumination conditions.

An image processing apparatus (100, 120) includes an initial corresponding point computing section (113) for computing and outputting multiple sets of corresponding points across multiple images and a corresponding point recomputing section (104), which selects reference corresponding points, consisting of multiple sets of initial corresponding points with small error, from the multiple sets of initial corresponding points by using a photometric constraint equation and a geometric constraint equation, newly computes aimed corresponding points associated with those reference corresponding points, and then outputs the reference corresponding points and the aimed corresponding points as corresponding points.

16 Claims, 13 Drawing Sheets

U.S. PATENT DOCUMENTS

| | | | |
|---|---|---|---|
| 7,593,571 B2* | 9/2009 | Wakabayashi | 382/173 |
| 2001/0007594 A1* | 7/2001 | Kadomatsu et al. | 382/151 |
| 2004/0036795 A1* | 2/2004 | Fujii et al. | 348/349 |

FOREIGN PATENT DOCUMENTS

| | | |
|---|---|---|
| JP | 07-066989 | 3/1995 |
| JP | 08-233556 | 9/1996 |
| JP | 2000-036051 | 2/2000 |
| JP | 2000-242785 | 9/2000 |

OTHER PUBLICATIONS

Tomasi et al.; "Detection and Tracking of Point Features," Carnegie Mellon University Technical Report CMU-CS-91-132; Apr. 1991; pp. 1-31; p. 2 of the description.

Shashua; "Geometry and Photometry in 3D Visual Recognition," PhD Thesis, the Department of Brain and Cognitive Services, MIT; Nov. 1992; pp. 79-91, p. 43 of the description; pp. 107-124, p. 72 of the description.

Black et al.; "Eigen Tracking: Robust Matching and Tracking of Articulated Objects Using a View-Based Representation," European Conf on Computer Vision, ECCV'96, Cambridge, England; Apr. 1996; pp. 1-14.

Hager et al.; "Efficient Region Tracking With Parametric Models of Geometry and Illumination," submitted to IEEE Trans on PAMI; 1998; pp. 1-34.

Shashua; "Trilinear Tensor: The Fundamental Construct of a Multiple-view Geometry and its Applications.".

International Search Report for corresponding International Application No. PCT/JP2008/000386, mailed Mar. 25, 2008.

\* cited by examiner (a) EXAMPLE OF SHOOTING SITUATION (b) EXAMPLE OF IMAGE SHOT (a) FIRST SHOT (b) SECOND SHOT (c) THIRD SHOT (d) FOURTH SHOT (a)I1 (j=1)

(b)I2 (j=2)

(c)I3 (j=3)

(d)I4 (j=4)

(e)I5 (j=5)

(f)I6 (j=6)

(a) I3,1 (j=1)

(b) I3,2 (j=2)

(c) I3,3 (j=3)

(d) I3,4 (j=4)

(e) I3,5 (j=5)

(f) I3,6 (j=6)

(a) I''1 (j=1)

(b) I''2 (j=2)

(c) I''3 (j=3)

(d) I''4 (j=4)

(e) I''5 (j=5)

(f) I''6 (j=6)

(a) SYNTHETIC IMAGE (b) IMAGE OBTAINED BY SIMPLY
ENLARGING INCOMING IMAGE (a) TWO EXEMPLARY INCOMING IMAGES I3 (j=3) AND I4 (j=4)
AND THEIR ENLARGED VERSIONS (b) SYNTHETIC IMAGE
GENERATED ON
CORRESPONDING POINTS WITH
MUCH POSITIONAL ERROR (c) SYNTHETIC IMAGE
GENERATED ON
CORRESPONDING POINTS WITH
LITTLE POSITIONAL ERROR

APPARATUS AND METHOD FOR IMAGE PROCESSING, IMAGE PROCESSING PROGRAM AND IMAGE PROCESSOR

TECHNICAL FIELD

The present invention relates to an image processing technique for computing corresponding points between multiple images. More particularly, the present invention relates to an image processing technique for computing corresponding points with little positional error even if the relative positions of a subject to a light source change between multiple images.

BACKGROUND ART

Various techniques for computing corresponding points between multiple images or a motion vector in a moving picture have been researched and developed extensively. These are fundamental techniques that are commonly used in image quality improving processing such as photometric image stabilization for digital camcorders and digital cameras, moving picture encoding processing, safe driving support systems for automobiles, shape recognition processing for robots and so on.

As used herein, "multiple images" sometimes refers to multi-viewpoint images that have been shot by multiple cameras with mutually different viewpoints and sometimes refers to a moving picture consisting of multiple images that have been shot back to back at regular time intervals (of a 1/30 second, for example) with a single camera. A technique for computing corresponding points between such multi-viewpoint images and a technique for calculating a motion vector in a moving picture have a lot in common, and therefore, will not be regarded herein as distinct ones.

Typical techniques for computing corresponding points between multiple images or a motion vector are disclosed in Patent Document No. 1 and Non-Patent Documents Nos. 1 and 2, for example. Specifically, a block matching method in which either a difference in luminance or a correlation value between rectangular areas of multiple images is used as an evaluation value to find a location with the best evaluation value is disclosed in Patent Document No. 1. A gradient method for calculating the magnitude of displacement based on the spatial gradient of the luminances of an image and the difference in luminance between multiple images is disclosed in Non-Patent Document No. 1. And a phase correlation method for calculating the magnitude of displacement by a Fourier transform using the peak value of a phase correlation function is disclosed in Non-Patent Document No. 2. However, it is known that these conventional techniques have a problem because if the illumination conditions (such as the relative positions of a light source, a subject and a camera or the intensities of light sources) were different between multiple images, the corresponding points computed would have increased positional errors.

Meanwhile, techniques for reducing such a positional error between corresponding points in multiple images that have been shot under mutually different illumination conditions are disclosed in Patent Documents Nos. 2 and 3, for example.

Specifically, according to the technique disclosed in Patent Document No. 2, some pixels, of which the luminances fall within a predetermined range, are extracted from an incoming image to reduce the influence of a mirror reflection area in an image and thereby calculate a motion vector with a reduced positional error. By adopting this technique, the error of a motion vector in a mirror reflection area could be reduced to a certain degree but the error of a motion vector in a non-mirror reflection area could not.

On the other hand, according to the technique disclosed in Patent Document No. 3, attention is paid to the spatial gradient of luminances and to edges, corners and other areas with a significant luminance variation and a motion vector is calculated in those areas. Such a technique can reduce the positional error of a motion vector in an edge area with a steep luminance gradient.

Patent Document No. 1: Japanese Patent No. 2676978
Patent Document No. 2: Japanese Patent Application Laid-Open Publication No. 2000-36051
Patent Document No. 3: Japanese Patent Application Laid-Open Publication No. 7-66989
Non-Patent Document No. 1: Bruce D. Lucas and Takeo Kanade, "An Iterative Image Registration Technique with an Application to Stereo Vision", International Joint Conference on Artificial Intelligence, pp. 674-679, 1981
Non-Patent Document No. 2: Carlo Tomasi and Takeo Kanade, "Detection and Tracking of Point Features", Carnegie Mellon University Technical Report CMU-CS-91-132, April 1991

DISCLOSURE OF INVENTION

Problems to be Solved by the Invention

However, such a method for calculating a motion vector in an edge area as the one disclosed in Patent Document No. 3 cannot contribute to reducing the positional error of a motion vector in a non-edge area. For that reason, if the subject has a solid-state shape and if the motion vectors change differently in edge and non-edge areas with the motion of that subject, then the positional error of a motion vector will increase in a non-edge area.

Thus, an object of the present invention is to generate corresponding points or a motion vector with reduced positional error even if the incoming images have been shot under different illumination conditions.

Means for Solving the Problems

An image processing apparatus according to the present invention includes: an initial corresponding point computing section for computing, based on image data representing a number N of images, n sets of initial corresponding points across the N images, where N and n are both integers, $N \geq 4$ and $n \geq 4$; a reference candidate generating section for selecting reference corresponding point candidates from the n sets of initial corresponding points to make M groups of reference corresponding point candidates such that each of the M groups is made up of s sets of initial corresponding points, where M and s are both integers, $M \geq 2$ and $4 \leq s \leq n$; a coefficient calculating section for calculating a photometric coefficient as a coefficient for a photometric constraint equation such that in each of the M groups of reference corresponding point candidates, luminance values of respective points on the images satisfy the photometric constraint equation; a new candidate generating section for generating multiple sets of aimed corresponding point candidates, each said set being comprised of new corresponding points that are associated with each other between the images, such that each of the M groups of reference corresponding point candidates satisfies a geometric constraint equation that is defined for that group between the images; a first selecting section for estimating, based on the luminance values of the respective points on the images and the photometric coefficient calculated, how much those sets of aimed corresponding point candidates satisfy the photometric constraint equation and selecting a single set of aimed corresponding point candidates based on a result of the estimation and outputting the set as aimed corresponding points; and a second selecting section for evaluating the M groups of reference corresponding point candidates based on the result of the estimation obtained by the first selecting section, selecting a single set of reference corresponding point candidates from the M groups based on a result of the evaluation, and outputting the selected single set of reference corresponding point candidates and aimed corresponding points associated with the selected candidates as corresponding points across the N images.

The reference candidate generating section may estimate the degree of independence of an N×s luminance matrix, comprised of the luminance values of the selected s sets of initial corresponding points on the N images, and may select the M groups of reference corresponding point candidates based on a result of the estimation.

The reference candidate generating section may use the ratio of a third eigenvalue to a first eigenvalue of the N×s luminance matrix as an estimated value and may start selecting the reference corresponding point candidates sequentially from a group of s initial corresponding points that is associated with an N×s luminance matrix that has produced the greatest estimated value.

If the ratio of a third eigenvalue to a first eigenvalue of the N×s luminance matrix is smaller than a predefined threshold value, the reference candidate generating section may exclude the s sets of initial corresponding points, associated with the N×s luminance matrix, from the reference corresponding point candidates.

The reference candidate generating section may estimate the magnitudes of spatial gradients of the luminance values in the vicinity of the points on the respective images with respect to the selected s sets of initial corresponding points and may select the s sets of initial corresponding points with the greatest spatial gradient preferentially as the reference corresponding point candidates.

The N images may be color pictures. In that case, the reference candidate generating section may estimate a degree of correlation between the color pictures in the vicinity of the points on the respective images with respect to the selected s sets of initial corresponding points and may select the s sets of initial corresponding points with the lowest degree of correlation preferentially as the reference corresponding point candidates.

The coefficient calculating section may apply a spatial low pass filter, of which the cutoff frequency is determined by either a point-to-point distance between the points on the respective images or a zoom ratio of a subject on the respective images, to the image data and may use resultant luminance values as those of mutually associated points on the respective images.

The coefficient calculating section may calculate the photometric coefficient by replacing the luminance value of a point representing each said reference corresponding point candidate on its associated image with that of at least one point located in the vicinity of the former point.

Alternatively, the coefficient calculating section may also calculate the photometric coefficient by using the luminance value of at least one point, which is located in proximity of said point and of which the luminance value is different from that of said point by no more than a predetermined magnitude.

If the difference between the luminance value of said point and that of a proximate point located around said point exceeds a predetermined range, the coefficient calculating section may calculate the photometric coefficient using the luminance value of at least one point that is located in the vicinity of said point.

The image processing apparatus may further include: a coordinate transformation section for generating a set of coordinate transformed images by magnifying at least one of the N images at a predetermined zoom ratio and by mapping, as pixel values of the magnified image, respective pixel values of at least k images (where k is an integer and $3 \leq k \leq N$) among the N images according to the predetermined zoom ratio; and an image generating section, which selects k coordinate transformed images from those coordinate transformed images, calculates a transform coefficient as a coefficient for the photometric constraint equation such that the luminance values of points on the respective coordinate transformed images, which are associated with each other between the k coordinate transformed images, satisfy the photometric constraint equation, and linearly combines the N coordinate transformed images with the transform coefficient, thereby generating a synthetic image.

The image generating section may select the k coordinate transformed images according to the magnitude of a subject area ratio, which is defined as the ratio of the area of a subject in any of the coordinate transformed images to that of the same subject in its original one yet to be transformed.

An image processing method according to the present invention includes the steps of: computing, based on image data representing a number N of images, n sets of initial corresponding points across the N images, where N and n are both integers, $N \geq 4$ and $n \geq 4$; selecting s sets of initial corresponding points from the n sets of initial corresponding points, where s is an integer and $4 \leq s \leq n$; making M groups of reference corresponding point candidates such that each of the M groups is made up of s sets of initial corresponding points, where M is an integer and $M \geq 2$; calculating a photometric coefficient as a coefficient for a photometric constraint equation such that in each of the M groups of reference corresponding point candidates, luminance values of respective points on the images satisfy the photometric constraint equation; generating multiple sets of aimed corresponding point candidates, each said set being comprised of new corresponding points that are associated with each other between the images, such that each of the M groups of reference corresponding point candidates satisfies a geometric constraint equation that is defined for that group between the images; estimating, based on the luminance values of the respective points on the images and the photometric coefficient calculated, how much those sets of aimed corresponding point candidates satisfy the photometric constraint equation; selecting a single set of aimed corresponding point candidates based on a result of the estimation and outputting the set as aimed corresponding points; evaluating the M groups of reference corresponding point candidates based on the result of the estimation, and selecting a single set of reference corresponding point candidates from the M groups based on a result of the evaluation; and outputting the selected single set of reference corresponding point candidates and aimed corresponding points associated with the selected candidates as corresponding points across the N images.

On a storage medium according to the present invention, a computer program is stored. The computer program is defined so as to make a computer perform the steps of: computing, based on image data representing a number N of images, n sets of initial corresponding points across the N images, where N and n are both integers, $N \geq 4$ and $n \geq 4$; making M groups of reference corresponding point candidates such that each of the M groups is made up of s sets of initial corresponding points across the N images, where M and s are both integers, $M \geq 2$ and $4 \leq s \leq n$; calculating a photometric coefficient as a coefficient for an photometric constraint equation such that in each of the M groups of reference corresponding point candidates, luminance values of respective points on the images satisfy the photometric constraint equation; generating multiple sets of aimed corresponding point candidates, each said set being comprised of new corresponding points that are associated with each other between the images, such that each of the M groups of reference corresponding point candidates satisfies a geometric constraint equation that is defined for that group between the images; estimating, based on the luminance values of the respective points on the images and the photometric coefficient calculated, how much those sets of aimed corresponding point candidates satisfy the photometric constraint equation; selecting a single set of aimed corresponding point candidates based on a result of the estimation and outputting the set as aimed corresponding points; evaluating the M groups of reference corresponding point candidates based on the result of the estimation, and selecting a single set of reference corresponding point candidates from the M groups based on a result of the evaluation; and outputting the selected single set of reference corresponding point candidates and aimed corresponding points associated with the selected candidates as corresponding points across the N images.

A processor according to the present invention can execute a computer program. By executing an image processing program, the processor performs the steps of: computing, based on image data representing a number N of images, n sets of initial corresponding points across the N images, where N and n are both integers, $N \geq 4$ and $n \geq 4$; making M groups of reference corresponding point candidates such that each of the M groups is made up of s sets of initial corresponding points across the N images, where M is an integer and $M \geq 2$; calculating a photometric coefficient as a coefficient for a photometric constraint equation such that in each of the M groups of reference corresponding point candidates, luminance values of respective points on the images, which are associated with each other between the images, satisfy the photometric constraint equation; generating multiple sets of aimed corresponding point candidates, each said set being comprised of new corresponding points that are associated with each other between the images, such that each of the M groups of reference corresponding point candidates satisfies a geometric constraint equation that is defined for that group between the images; estimating, based on the luminance values of the respective points on the images, which are associated with each other between the images, and the photometric coefficient calculated, how much those sets of aimed corresponding point candidates satisfy the photometric constraint equation; selecting a single set of aimed corresponding point candidates based on a result of the estimation and outputting the set as aimed corresponding points; evaluating the M groups of reference corresponding point candidates based on the result of the estimation, and selecting a single set of reference corresponding point candidates from the M groups based on a result of the evaluation; and outputting the selected single set of reference corresponding point candidates and aimed corresponding points associated with the selected candidates as corresponding points across the N images.

Another image processing apparatus according to the present invention includes: an initial corresponding point computing section for computing, based on image data representing a number N of images, n sets of initial corresponding points across the N images, where N and n are both integers, $N \geq 4$ and $n \geq 4$; and a corresponding point recomputing section, which selects s sets (where s is an integer and $4 \leq s \leq n$) of initial corresponding points, which satisfy a geometric constraint equation and a photometric constraint equation, from the n sets of initial corresponding points and outputs the s sets as reference corresponding points and which computes, based on the reference corresponding points, aimed corresponding points that satisfy the geometric and photometric constraint equations and outputs the aimed corresponding points.

Effects of the Invention

According to the present invention, points that satisfy both a photometric constraint equation, which expresses a constraint imposed on a luminance variation that depends on a change of relative positions between a subject and a light source, and a geometric constraint equation, which expresses a constraint imposed on corresponding points that depend on a change of relative positions between the subject and a camera, are defined as corresponding points that are associated with each other between multiple images. For that reason, even if the relative positions of a subject with respect to a light source change between multiple images, the corresponding points can also be computed with the positional error reduced. Also, by applying the present invention to the processing of increasing the resolution of a moving picture, video data of high image quality (i.e., with a high resolution) can be obtained with the positional error of a motion vector reduced.

Figure 1:
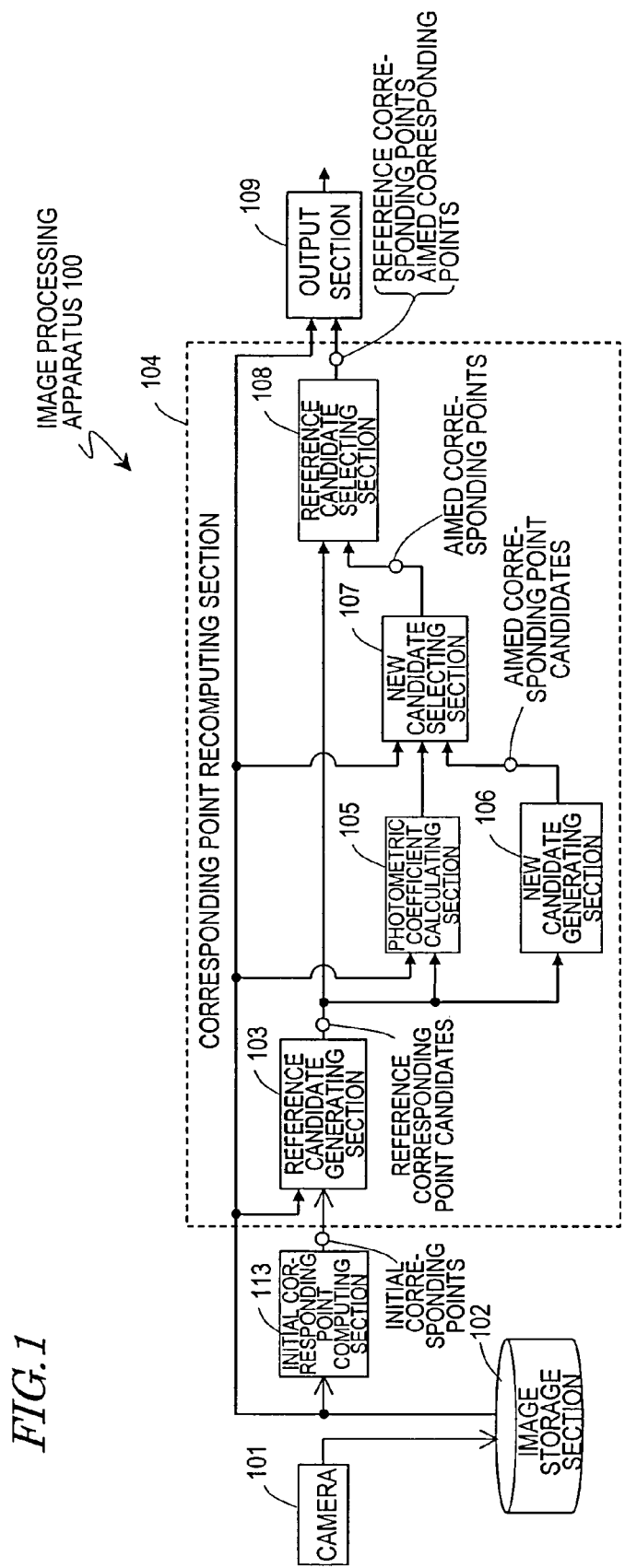
FIG. 1 shows an arrangement of functional blocks in an image processing apparatus 100 as a first preferred embodiment of the present invention.

DESCRIPTION OF REFERENCE NUMERALS 100, 120 image processing apparatus
101 camera
102 image storage section
113 initial corresponding point computing section
103 reference candidate generating section
104 corresponding point recomputing section
105 photometric coefficient calculating section
106 new candidate generating section
107 new candidate selecting section
108 reference candidate selecting section
109 output section
110 image synthesizing section
111 coordinate transformation section
112 image generating section

BEST MODE FOR CARRYING OUT THE INVENTION

Hereinafter, preferred embodiments of an image processing apparatus according to the present invention will be described with reference to the accompanying drawings.

In this description, the term "corresponding point" is defined with respect to a single or multiple images that has/have been taken by shooting a subject that is present in an actual space.

A "corresponding point" means a point on a single image that corresponds to an arbitrary point in an actual space.

Meanwhile, "corresponding points across a number N of images" refers to a set of corresponding points that are defined on multiple (i.e., a number N of) images so as to correspond to an arbitrary point in an actual space. These are a set of corresponding points that are defined on the respective images so as to correspond to the same point in the actual space. More specifically, those points are represented as a set of image coordinate values including the respective image coordinate values of the corresponding points on the N images. It should be noted that the "corresponding points across multiple images" are not defined by finding the counterpart of a single point on a particular image on another image.

On the other hand, "multiple sets (e.g., n sets of) corresponding points across multiple (e.g., a number N of) images" refers to sets of corresponding points across the N images that are defined for the n points in the actual space. That is to say, the "n sets of corresponding points across the N images" are formed by finding "a set of corresponding points across the N image" at each of n different points. In this case, there are n different corresponding points, belonging to mutually different sets, on each of those images.

Various types of corresponding points such as "initial corresponding points" and "reference corresponding points" will be defined in the following description. However, these definitions will apply to any of those types of corresponding points.

Embodiment 1

FIG. 1 shows an arrangement of functional blocks in an image processing apparatus 100 as a first preferred embodiment of the present invention. The Image Processing apparatus 100 includes a camera 101, an image storage section 102, an initial corresponding point computing section 112, a corresponding point recomputing section 104, and an output section 109.

The camera 101 captures an image of a subject and outputs image data. The camera 101 may output either a moving picture or a still picture as the image data. In processing moving picture data, image data, consisting of multiple pictures to be changed at a predetermined frequency (of 30 Hz, for example), is output. In processing still picture data, on the other hand, image data of a single image is output.

The image storage section 102 is a storage medium that stores the data of an image that has been shot with the camera 101, and may be implemented as a frame memory or a hard disk drive, for example. The image data that is stored in the image storage section 102 is supplied to the initial corresponding point computing section 113 and the corresponding point recomputing section 104 as will be described later.

The initial corresponding point computing section 113 receives the image data that is stored in the image storage section 102 and generates multiple sets of corresponding points across multiple images (which will be referred to herein as "initial corresponding points") based on that image data.

The corresponding point recomputing section 104 receives the multiple sets of initial corresponding points, which have been generated by the initial corresponding point computing section 113, and the image data, and extracts a number of subsets from all of those initial corresponding points that form a universal set. By performing the processing to be described later, a "set of reference corresponding points" is defined by a set of initial corresponding points that form each of those subsets. For that reason, a set of initial corresponding points that form each of those subsets will be referred to herein as "reference corresponding point candidates". The corresponding point recomputing section 104 selects a set of best reference corresponding points from those reference corresponding point candidates. In addition, the corresponding point recomputing section 104 outputs not only the selected set of best reference corresponding points but also another set of corresponding points that have been newly generated with respect to those reference corresponding points (which will be referred to herein as "aimed corresponding points").

The corresponding point recomputing section 104 includes a reference candidate generating section 103, a photometric coefficient calculating section 105, a new candidate generating section 106, a new candidate selecting section 107 and a reference candidate selecting section 108.

The reference candidate generating section 103 receives the multiple sets of initial corresponding points across the multiple images, which have been generated by the initial corresponding point computing section 113, selects multiple subsets of initial corresponding points from all of those initial corresponding points, and generates multiple groups of reference corresponding point candidates such that each group consists of a predetermined number of subsets of initial corresponding points.

The photometric coefficient calculating section 105 receives the image data and the multiple groups of reference corresponding point candidates and calculates an photometric coefficient as a coefficient for an photometric constraint equation such that in each of those groups of reference corresponding point candidates, luminance values of respective points on the images, which are associated with each other between the images, satisfy the photometric constraint equation.

The new candidate generating section 106 receives the multiple reference corresponding point candidates, newly computes multiple corresponding points, which satisfy a geometric constraint equation, with respect to the reference corresponding points candidates, and outputs the new corresponding points as aimed corresponding point candidates.

The new candidate selecting section 107 receives the image data, the photometric coefficient for the respective reference corresponding point candidates and the aimed corresponding point candidates, estimates how much those aimed corresponding point candidates satisfy the photometric constraint equation, selects a single set of aimed corresponding point candidates based on a result of the estimation, and outputs the set as aimed corresponding points that have been selected from the reference corresponding point candidates.

The reference candidate selecting section 108 receives the multiple reference corresponding point candidates and their associated aimed corresponding points, evaluates the originally selected reference corresponding point candidates based on the result of the estimation obtained by the new candidate selecting section 107, and selects a single set of reference corresponding point candidates from the groups of reference corresponding point candidates based on a result of the evaluation. And then the reference candidate selecting section 108 outputs the selected reference corresponding points and aimed corresponding points associated with the selected reference corresponding points as corresponding points across the multiple images of the image data.

The output section 109 outputs, in combination, the multiple images that are stored in the image storage section 102 and the corresponding points that have been computed by the corresponding point recomputing section 104.

In this preferred embodiment, the image processing apparatus 100 includes not only the initial corresponding point computing section 113 and corresponding point recomputing section 104 for computing corresponding points across multiple images but also the camera 101 and image storage section 102 for shooting and storing an image and the output section 109 that outputs the captured image and the corresponding points in combination. Thus, the image processing apparatus 100 can compute and output the corresponding points of images that have been shot with the camera.

To make the present invention easily understandable, first, it will be outlined by way of a specific example how this image processing apparatus 100 works. After that, the operating principle and specific operation of the image processing apparatus 100 will be described.

Outline of how Image Processing Apparatus 100 Works

Figure 2:
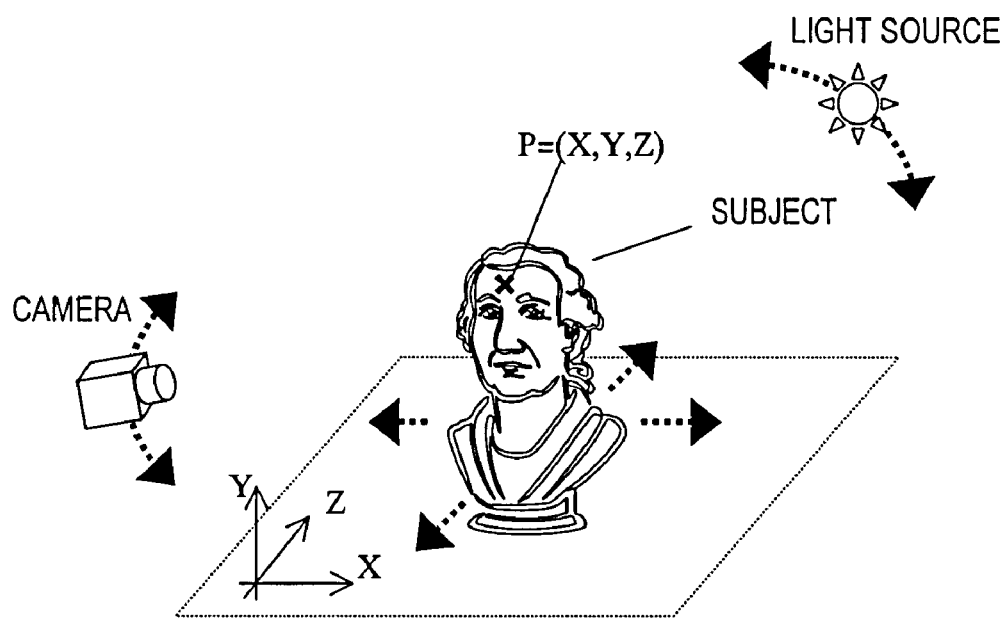
FIG. 2(a) illustrates an image shooting environment in which the image processing apparatus 100 is used.
FIG. 2(b) illustrates an example of an image shot.
Figure 2:
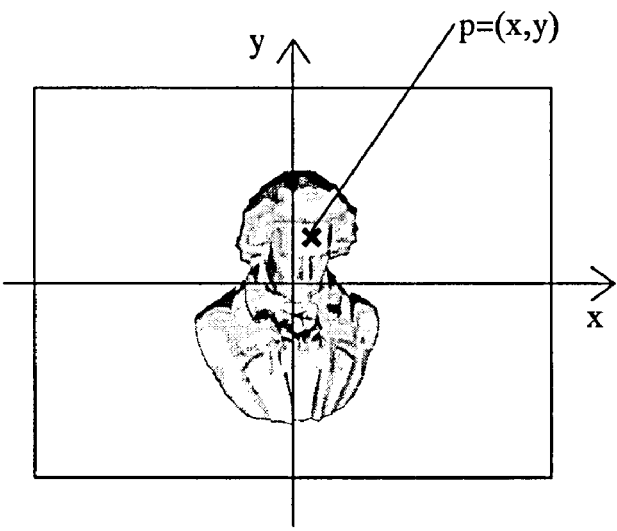

FIG. 2(a) illustrates an image shooting environment in which the image processing apparatus 100 is used, and FIG. 2(b) illustrates an example of an image shot. As shown in FIG. 2(a), in this preferred embodiment, the camera, the subject (which is a bust in this example) and the light source are supposed to change their positions arbitrarily irrespective of the operation of the image processing apparatus 100. The incoming images are supposed herein to be a series of (i.e., a number N of) images that have been shot in the environment shown in FIG. 2(a). The three-dimensional (X, Y, Z) coordinate system shown in FIG. 2 is supposed to be fixed on the subject.

Figure 4:
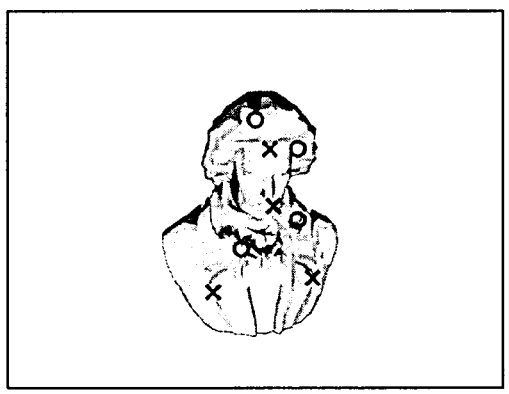
FIG. 4 shows examples of reference corresponding point candidates.
Figure 4:
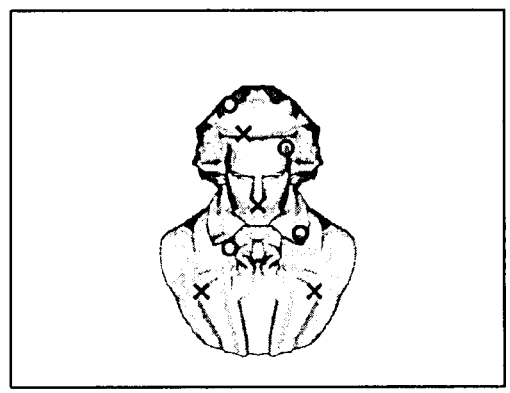
Figure 4:
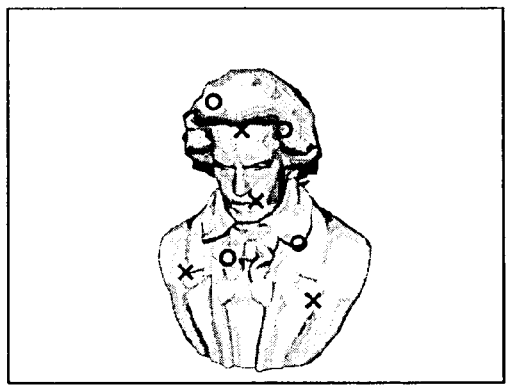
Figure 4:

Suppose four shots of the same subject (i.e., N=4) have been obtained as shown in FIG. 4. If eight points are defined on the subject (i.e., in a situation where n=8), then four points, representing the same location on the subject, can be put on those four images for each of those eight points as indicated by the open circles ○ and the crosses x in FIG. 4. Those points on the images are "corresponding points", and each set of four points representing the same location on the subject is "corresponding points across multiple images". Also, suppose four sets of corresponding points have had their coordinates accurately calculated successfully among those eight sets of corresponding points across the four images. In that case, those four sets of corresponding points (i.e., s=4) will be referred to herein as a "group of reference corresponding points", which may be the four sets of open circles shown in FIG. 4, for example.

The coordinate values (i.e., position vectors) of four corresponding points, representing, on the four images, the same arbitrary location on the subject, are described by linearly combining the coordinate values (position vectors) of their reference corresponding points on the same four images. An equation to be satisfied in such a situation will be referred to herein as a "geometric constraint equation". The coefficient to be multiplied with the coordinate values of each reference corresponding point will be identified herein by A.

Furthermore, if another image (i.e., a fifth image in this example) has been newly generated, then eight corresponding points, also associated with the eight different locations on the subject, respectively, may also be put on that new image. In that case, the coordinates (i.e., position vectors) of those corresponding points on the newly generated image may be described by linearly combining the coordinate values (position vectors) of respective corresponding points on the previous four images. An equation to be satisfied in such a situation will also be referred to herein as a "geometric constraint equation". The coefficient to be multiplied with the coordinate values of each corresponding point will be identified herein by B. The coefficient B for this geometric constraint equation can be obtained based on the coordinates of a point on the newly generated image that is associated with the four reference corresponding points on the previous four images.

A pixel value (e.g., a luminance value) at an arbitrary point on one of the four images can be described by linearly combining the pixel values at its associated corresponding points on the three other images. An equation to be satisfied in such a situation will be referred to herein as an "photometric constraint equation". The coefficient to be multiplied with the pixel value at each corresponding point will be identified herein by C.

If four reference corresponding points have been given, the coefficient for the photometric constraint equation can be obtained based on the given reference corresponding points.

If those four reference corresponding points have been given and if another set of corresponding points (i.e., aimed corresponding points) is going to be newly defined in addition to those reference corresponding points on the four images, that additional set of corresponding points needs to satisfy both the geometric constraint equation and the photometric constraint equation to which the coefficient described above is applied.

As will be described in detail later, if a point that has been put on a first shot (i.e., an aimed point) is given a candidate point that seems to be its corresponding point on a second shot, then not only the coefficient A for the geometric constraint equation but also the coordinates of corresponding points on third and fourth shots are calculated. If the corresponding point on the second shot has been given properly, then the set of corresponding points newly computed should satisfy the photometric constraint equation.

That is why according to this preferred embodiment, the locations of the corresponding point on the second shot are changed within a predetermined range, thereby obtaining corresponding point candidates on the third and fourth shots. And if the value obtained by substituting the pixel values of the corresponding point candidates on the first, second and third shots into the photometric constraint equation agrees with that of the corresponding point candidate on the fourth shot, then it is determined that the corresponding points have been set properly. Otherwise, one of the corresponding point candidates that has the smallest error is output as a correct corresponding point.

According to the processing method described above, a photometric coefficient is calculated based on the reference corresponding points, corresponding point candidates, associated with a given aimed point, are computed by the geometric constraint equation, and then the candidates are evaluated with the photometric constraint equation. The corresponding points thus obtained not only satisfy the geometric constraint equation without fail but also meet the photometric constraint equation most perfectly. That is why even if the relative positions between the subject and the light source have changed between multiple images, corresponding points can also be computed with the positional error reduced.

In the example described above, the sets of reference corresponding points are supposed to be accurately defined on the four images. However, when image data is given for the first time, for example, the reference corresponding points may have been given inaccurately. Thus, according to this preferred embodiment, multiple candidates are also generated for each of those reference corresponding points that are obtained by selecting four (i.e., s=4) out of the eight (i.e., n=8) sets of corresponding points. And those reference corresponding point candidates are subjected to the processing described above, thereby picking one of those reference corresponding point candidates that has resulted in the minimum error as a proper reference corresponding point. In this manner, not only the reference corresponding points but also another corresponding point (i.e., the aimed corresponding point) can be set accurately on each image.

Description of Operating Principle of Image Processing Apparatus 100

Hereinafter, the three operating principles used by the image processing apparatus 100 of this preferred embodiment will be described in detail with reference to FIG. 2. Specifically, those three principles are represented by two geometric constraint equations to be satisfied by the coordinate values of corresponding points and one photometric constraint equation to be satisfied by the luminance values of the corresponding points in a situation where all of those corresponding points have been given properly across multiple images. In deriving the constraint equations, the following four premises are made: (1) the subject of shooting is a rigid body; (2) light rays are incident on the subject parallel to each other; (3) the light rays are diffuse-reflected from the surface of the subject; and (4) an image of the subject is shot with an affine camera. It should be noted that even if there actually multiple objects but if their relative position does not change, then those objects can also be regarded as forming a single rigid body (i.e., a single subject).

First of all, the geometric constraint equation to be satisfied by corresponding points on multiple images will be described. Supposing the three-dimensional coordinate values of n points $P_i$ on the same subject, which is a rigid body, are represented by $(X_i, Y_i, Z_i)$ (where i=1, ... and n), points on N images obtained by monitoring the subject with an affine projection camera are represented by $p_{i,j}$ (where i=1, ... and n and j=1, ... and N), the image coordinate values of those points $p_{i,j}$ are represented by $(x_{i,j}, y_{i,j})$ (where i=1, ... and n and j=1, ... and N), $(x_{i,j}, y_{i,j})$ can be given by the following Equation (1) using a 2×4 matrix:

$$\begin{bmatrix} x_{i,j} \\ y_{i,j} \end{bmatrix} = \begin{bmatrix} a_{j1} & a_{j2} & a_{j3} & a_{j4} \\ b_{j1} & b_{j2} & b_{j3} & b_{j4} \end{bmatrix} \begin{bmatrix} X_i \\ Y_i \\ Z_i \\ 1 \end{bmatrix}$$

$$= \begin{bmatrix} a_j^T \\ b_j^T \end{bmatrix} \begin{bmatrix} X_i \\ Y_i \\ Z_i \\ 1 \end{bmatrix} \quad (1)$$

$(i = 1 \ldots n, j = 1 \ldots N)$ where $a_j$ and $b_j$ are coefficients obtained by adding together the camera positions (including angles) in the subject coordinate system and the projections with the affine camera.

In this preferred embodiment, the camera 101 is supposed to be approximated as the affine camera model represented by Equation (1). In many cases, a perspective projection model is a better approximation to a general camera than the affine camera model represented by Equation (1). If the camera has a relatively long focal length, if the subject has a relatively small thickness in the depth direction, or if the subject has a relatively little movement, approximate accuracy of the affine camera is improved.

If a number N of images, each including a number n of points on the same subject, are shot with the camera positions changed, then the coordinate values of those points on the images are given by the following Equation (2):

$$\begin{bmatrix} x_{1,1} & & x_{n,1} \\ & \cdots & \\ y_{1,1} & & y_{n,1} \\ \vdots & \cdots & \vdots \\ x_{1,N} & & x_{n,N} \\ & \cdots & \\ y_{1,N} & & y_{n,N} \end{bmatrix} = \begin{bmatrix} a_1^T \\ b_1^T \\ \vdots \\ a_N^T \\ b_N^T \end{bmatrix} \begin{bmatrix} X_1 & & X_n \\ Y_1 & & Y_n \\ & \cdots & \\ Z_1 & & Z_n \\ 1 & & 1 \end{bmatrix} \quad (2)$$

where the affine projection matrix $a_j$, $b_j$ on the left half of the right side is supposed to be independent and the three-dimensional coordinate values $P_i$ of the corresponding points on the right half of the right side are also supposed to be independent. In that case, the right side will produce a fourth order space and the matrix on the left side will be rank 4 at most. Consequently, the following equation is satisfied.

Suppose four arbitrary sets of (i.e., s=4) corresponding points $p_{i,j}$ (where i=1, ... and 4 and j=1, ... and 4) on a number N of images (where N is an integer equal to or greater than four) are already known among the corresponding points $p_{i,j}$. In that case, the other corresponding points $p_{i',j'}$ (where i'= 5, ... and n) on the N images (i.e., j=1 ... and N) are represented by the following Equation (3):

$$\begin{bmatrix} x_{i',1} \\ y_{i',1} \\ \vdots \\ x_{i',N} \\ y_{i',N} \end{bmatrix} = A_{i'1} \begin{bmatrix} x_{1,1} \\ y_{1,1} \\ \vdots \\ x_{1,N} \\ y_{1,N} \end{bmatrix} + A_{i'2} \begin{bmatrix} x_{2,1} \\ y_{2,1} \\ \vdots \\ x_{2,N} \\ y_{2,N} \end{bmatrix} + A_{i'3} \begin{bmatrix} x_{3,1} \\ y_{3,1} \\ \vdots \\ x_{3,N} \\ y_{3,N} \end{bmatrix} + A_{i'4} \begin{bmatrix} x_{4,1} \\ y_{4,1} \\ \vdots \\ x_{4,N} \\ y_{4,N} \end{bmatrix} \quad (3)$$

$$\therefore \begin{bmatrix} x_{i',1} \\ y_{i',1} \\ \vdots \\ x_{i',N} \\ y_{i',N} \end{bmatrix} = \sum_{i=1}^{4} A_{i'i} \begin{bmatrix} x_{i,1} \\ y_{i,1} \\ \vdots \\ x_{i,N} \\ y_{i,N} \end{bmatrix}$$

$(i' = 5 \ldots n)$

Using the coordinate values of the n sets of corresponding points on the first through fourth shots, the coordinate values of the n corresponding points on the fifth image and so on (i.e., j=5 . . . and N) are given by the following Equation (4):

$$\begin{bmatrix} x_{1,j'} & \cdots & x_{n,j'} \\ y_{1,j'} & & y_{n,j'} \end{bmatrix} = B_{j'1} \begin{bmatrix} x_{1,1} & \cdots & x_{n,1} \\ y_{1,1} & & y_{n,1} \end{bmatrix} + B_{j'2} \begin{bmatrix} x_{1,2} & \cdots & x_{n,2} \\ y_{1,2} & & y_{n,2} \end{bmatrix} + \\ B_{j'3} \begin{bmatrix} x_{1,3} & \cdots & x_{n,3} \\ y_{1,3} & & y_{n,3} \end{bmatrix} + B_{j'4} \begin{bmatrix} x_{1,4} & \cdots & x_{n,4} \\ y_{1,4} & & y_{n,4} \end{bmatrix} \quad (4)$$

$$\therefore \begin{bmatrix} x_{1,j'} & \cdots & x_{n,j'} \\ y_{1,j'} & & y_{n,j'} \end{bmatrix} = \sum_{j=1}^{4} B_{j'j} \begin{bmatrix} x_{1,j} & \cdots & x_{n,j} \\ y_{1,j} & & y_{n,j} \end{bmatrix}$$

$(j' = 5 \ldots n)$

These two equations satisfied between the coordinate values of multiple corresponding points will be referred to herein as "geometric constraint equations". As those equations are disclosed by A. Shashua in "Trilinear Tensor: the Fundamental Construct of Multiple-View Geometry and its Applications", APAC 1997 and other documents, those documents are hereby incorporated by reference and a detailed description thereof will be omitted herein.

Next, the photometric constraint equation to be satisfied between the luminance values of multiple corresponding points will be described. The photometric constraint equation is satisfied between the luminance values of multiple images, in which the subject is located at mutually different relative positions with respect to the illumination, in a situation where the subject is a diffuse reflective object and the illumination is a parallel light source.

In this example, the images are supposed to be grayscale (monochrome) images and the luminance values of pixels including corresponding points $p_{i,j}$ on a number N of image $I_j$ (where j=1, . . . and N) are represented by $I_j(p_{i,j})$. In that case, using the luminance values $I_j(p_{i,j})$ (where j=1, 2 and 3) of the corresponding points on the first through third shots, the luminance values $I_{j'}(p_{i,j'})$ of the corresponding points on the fourth shot and so on are represented by the following Equation (5):

$$I_{j'}(p_{i,j'}) = C_{j'1} I_1(p_{i,1}) + C_{j'2} I_2(p_{i,2}) + C_{j'3} I_3(p_{i,3}) \quad (5)$$

$$= \sum_{j=1}^{3} C_{j'j} I_j(p_{i,j})$$

For more details of the photometric constraint equation, see A. Shashua, "Geometry and Photometry in 3D Visual Recognition", Ph. D Thesis, pp. 79-91, Dept. Brain and Cognitive Science, MIT (1992), for example, which is hereby incorporated by reference and a detailed description thereof will be omitted herein.

Detailed Description of Operation of Image Processing Apparatus 100

Next, it will be described in further detail exactly how the image processing apparatus 100 works based on the operating principle mentioned above.

In this preferred embodiment, the user is supposed to shoot a series of images that form a moving picture by operating the camera 101 in the shooting environment shown in FIG. 2(a). The image processing apparatus 100 temporarily stores the data of the captured moving picture in the image storage section 102, and figures out corresponding points on that data, thereby performing image processing.

Figure 3:
FIG. 3 illustrates an exemplary series of images of a moving picture that have been captured by the camera 101 and then stored in the image storage section 102.

In response to the user's operation, the camera 101 shoots a moving picture in the shooting environment shown in FIG. 2 and sends the image data to the image storage section 102, which stores the image data in response. FIG. 3 illustrates an exemplary series of images of a moving picture that have been captured by the camera 101 and then stored in the image storage section 102. The shooting is done with the camera and the subject moved little by little with respect to the illumination to produce the six images in the order of the upper left, upper right, middle left, middle right and lower ones.

Using the image data of four or more images stored in the image storage section 102 such as those shown in FIG. 3, the image processing apparatus 100 figures out and outputs corresponding points between the images. In each of those images, the same subject has been shot and is supposed to be a rigid body.

The initial corresponding point computing section 113 receives the image data shown in FIG. 3, and computes a predetermined number of sets of (i.e., n sets of) initial corresponding points across each series of four images (i.e., N=4).

In this preferred embodiment, the initial corresponding points across multiple images are supposed to be computed by a block matching method in which the degrees of normalized cross correlation between small rectangular areas are used as evaluation values to find a location with the highest degree of correlation. A method for searching for corresponding points by such a block matching method that is based on the normalized cross correlation is already known in the art as disclosed by Masatoshi Okutomi (ed.) in "Digital Image Processing", pp. 202-204, published by Computer Graphic Arts Society of Japan, and a detailed description thereof will be omitted herein.

It should be noted that the initial corresponding points that have been computed by the initial corresponding point computing section 113 by the conventional corresponding point computing method would have a significant positional error between themselves particularly if the illumination conditions have changed between multiple images as already pointed out in the background. That is why the n sets of initial corresponding points generated by the initial corresponding point computing section 113 will have sets of corresponding points with a significant positional error at a probability that is too high to neglect.

To overcome such a problem, the corresponding point recomputing section 104 selects reference corresponding points, which are four sets (i.e., s=4) of initial corresponding points with the minimum positional error, from the n sets of initial corresponding points that have been generated by the initial corresponding point computing section 113 with a set of corresponding points with a significant positional error. Then, the corresponding point recomputing section 104 outputs the reference corresponding points, along with the aimed corresponding points that have been newly generated based on the reference corresponding points selected, as new corresponding points.

Hereinafter, the operation of the corresponding point recomputing section 104 will be described in further detail.

The reference candidate generating section 103 receives the n sets of initial corresponding points, which have been computed by the initial corresponding point computing section 113 across the four images, selects one group of four sets after another at random, and forms a group of reference corresponding point candidates by each group of initial corresponding points thus obtained. The reference candidate generating section 103 generates and outputs M groups of those reference corresponding point candidates, where M is an integer that is equal to or greater than two.

FIG. 4 shows examples of reference corresponding point candidates. In FIG. 4, as for reference corresponding point candidates that are the four sets of initial corresponding points indicated by the open circles ○, the corresponding points have been computed substantially accurately. On the other hand, as for the other reference corresponding point candidates that are the four sets of initial corresponding points indicated by the crosses x, some sets of corresponding points (e.g., a set of corresponding points near the nose of the bust) have been computed with a significant positional error.

The photometric coefficient calculating section 105 receives the four incoming images and the M groups of reference corresponding point candidates generated by the reference candidate generating section 103. And the photometric coefficient calculating section 105 calculates the photometric coefficient $C_{j'}$ for each group of reference corresponding point candidates by Equation (5), which shows a relation between the luminance values in the four sets of corresponding points that form the reference corresponding point candidates, and outputs the coefficient.

More specifically, suppose the first, second and third ones of the four images are identified by $I_1$, $I_2$ and $I_3$, respectively, and the remaining fourth shot by $I_j$. In that case, the luminance values $I_j(p_{i,j})$ of the four sets of corresponding points, which form the respective reference corresponding point candidates, satisfy Equation (5), and therefore, three coefficients $C_{j',1}$, $C_{j',2}$ and $C_{j',3}$ in Equation (5) can be calculated. These three photometric coefficients are calculated and output for each of the M groups of reference corresponding point candidates.

Figure 5:
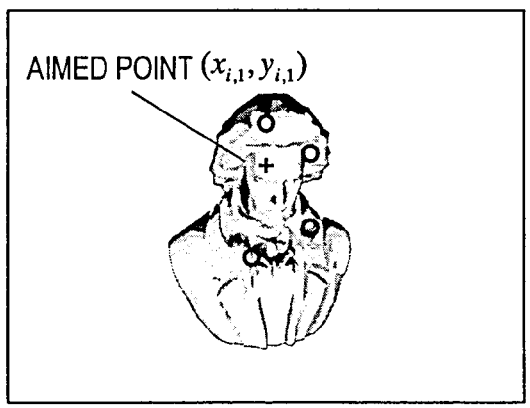
FIGS. 5(a) through 5(d) show exemplary aimed corresponding point candidates on respective images.
Figure 5:
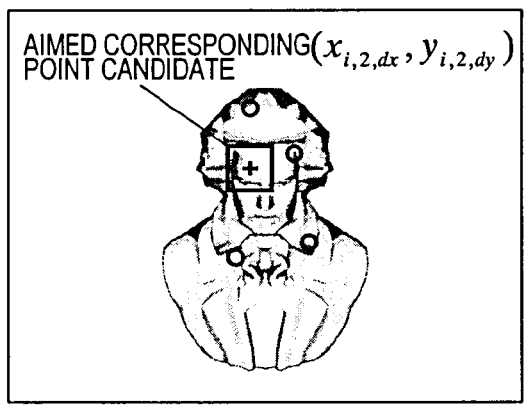
Figure 5:
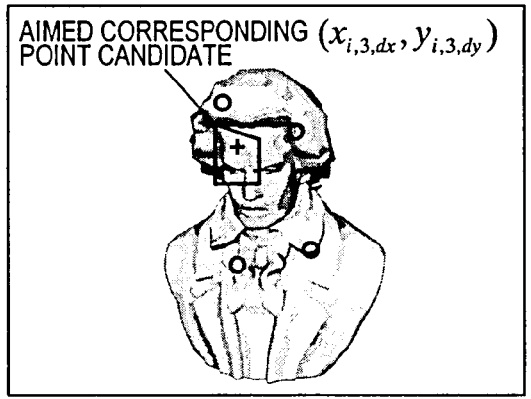
Figure 5:
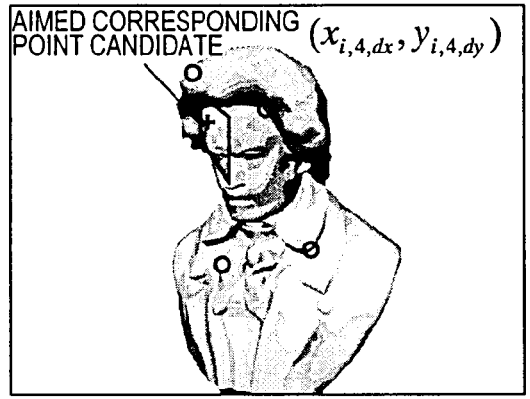

The new candidate generating section 106 receives the M groups of reference corresponding point candidates, computes multiple corresponding points that satisfy the geometric constraint equation for each of multiple sets of initial corresponding points that form the reference corresponding point candidates, and outputs those corresponding points as aimed corresponding point candidates. The aimed corresponding point candidates are a different set of corresponding points from the one formed by the reference corresponding point candidates. Hereinafter, it will be described with reference to FIG. 5 how to compute aimed corresponding point candidates associated with a set of reference corresponding point candidates.

FIGS. 5(a) through 5(d) show examples of aimed corresponding point candidates. In FIGS. 5(a) through 5(d), the open circles ○ indicate one out of the M groups of reference corresponding point candidates. For example, the reference corresponding point candidates that are located on the forehead of the subject's bust (and that are indicated by the open circles ○) are associated with each other between the images as corresponding points for the forehead of the subject's bust. In the following description, the reference corresponding point candidates that are associated with each other between the images are supposed to have almost no positional error. In that case, if each single aimed point is represented by the image coordinate values $(x_{i,1}, y_{i,1})$ of an associated one of the pixels on the first shot, the new candidate generating section 106 calculates the image coordinate values of its corresponding points on the second, third and fourth shots.

Hereinafter, the procedure of computing the corresponding point candidates (i.e., aimed corresponding point candidates) on the second, third and fourth shots with respect to the single aimed point $(x_{i,1}, y_{i,1})$ will be described.

The coordinates $(x_{i,2,dx}, y_{i,2,dy})$ of the corresponding point candidate on the second shot, which is associated with the aimed point $(x_{i,1}, y_{i,1})$, are given by the widths ±wsx and ±wsy of a rectangular search area that is defined in advance around the point $(x_{i,1}, y_{i,1})$ as represented by the following Equation (6):

$$x_{i,2,dx} = x_{i,1} + dx, (dx = -wsx \ldots wsx)$$

$$y_{i,2,dy} = y_{i,1} + dy, (dy = -wsy \ldots wsy) \quad (6)$$

Supposing the coordinates $(x_{i,2,dx}, y_{i,2,dy})$ of the corresponding point candidate on the second shot has been given in advance with respect to the aimed point $(x_{i,1}, y_{i,1})$ on the first shot, the coordinates $(x_{i,3,dx}, y_{i,3,dy})$ and $(x_{i,4,dx}, y_{i,4,dy})$ of the corresponding point candidates on the third and fourth shots can be calculated by the following Equation (7) that uses a function F obtained by modifying Equation (3):

$$x_{i,3,dx}, y_{i,3,dy}, x_{i,4,dx}, y_{i,4,dy} = F(x_{i,1}, y_{i,1}, x_{i,2,dx}, y_{i,2,dy}) \quad (7)$$

That is to say, Equation (7) means that once an aimed point on the first shot and a corresponding point candidate on the second shot have been determined, corresponding point candidates can be computed on the third and fourth shots.

Supposing the plus sign + shown in FIG. 5(a) indicates the aimed point on the first shot, multiple points falling within the rectangular area shown in FIG. 5(b) will be corresponding point candidates on the second shot. And the corresponding point candidates on the third and fourth shots will be located within the respective quadrilateral areas shown in FIGS. 5(c) and 5(d).

In this manner, a number W (=(2*wsx+1)×(2*wsy+1)) of corresponding point candidates $(x_{i,2,dx}, y_{i,2,dy})$, $(x_{i,3,dx}, y_{i,3,dy})$ and $(x_{i,4,dx}, y_{i,4,dy})$ can be computed with respect to a single aimed point $(x_{i,1}, y_{i,1})$ on the first shot. And these W corresponding point candidates form a set of aimed corresponding point candidates.

The new candidate generating section 106 performs this series of processing by putting an aimed point on each of a number S of pixels of the first shot, thereby generating S different sets of aimed corresponding point candidates for a single group of reference corresponding point candidates.

Furthermore, the new candidate generating section 106 performs this series of processing on each of the M groups of reference corresponding point candidates, thereby generating M×S sets of aimed corresponding point candidates in total. Each of the M×S×W sets of aimed corresponding point candidates that have been generated in this manner by the new candidate generating section 106 is a set of corresponding points that satisfies the geometric constraint equation (represented by Equation (3)) with respect to its associated reference corresponding point candidate.

The new candidate selecting section 107 receives the incoming images, the photometric coefficient calculated by the photometric coefficient calculating section 105, and the aimed corresponding point candidates generated by the new candidate generating section 106, thereby selecting one of the aimed corresponding point candidates that satisfies the photometric constraint equation (Equation (5)) most perfectly and outputting it. The new candidate selecting section 107 operates on the following principle.

Specifically, in each of multiple sets of aimed corresponding point candidates associated with a single set of reference corresponding point candidates, the most exact one of the W different corresponding point candidates (i.e., aimed corresponding points) associated with a single aimed point should satisfy the photometric constraint equation (Equation (5)) that is satisfied by that single set of reference corresponding point candidates.

In other words, in the most exact aimed corresponding point in a set of aimed corresponding point candidates (consisting of W different candidates), the following error estimation equation err $(x_{i,1}, y_{i,1}, x_{i,2,dx}, y_{i,2,dy})$ (Equation (8)), representing the relation between the photometric coefficient Cj', the aimed point $(x_{i,1}, y_{i,1})$ on the first shot, and its corresponding point candidates $(x_{i,2,dx}, y_{i,2,dy})$ $(x_{i,3,dx}, y_{i,3,dy})$ and $(x_{i,4,dx}, y_{i,4,dy})$ should ideally become equal to zero.

$$err(x_{i,1},y_{i,1},x_{i,2,dx},y_{i,2,dy})=I_4(x_{i,4,dx},y_{i,4,dy})-\{C_{41}I_1(x_{i,1},y_{i,1})+C_{42}I_2(x_{i,2,dx},y_{i,2,dy})+C_{43}I_3(x_{i,3,dx},y_{i,3,dy})\} \quad (8)$$

Thus, the new candidate selecting section 107 figures out and selects $(x_{i,2}, y_{i,2})$, $(x_{i,3}, y_{i,3})$ and $(x_{i,4}, y_{i,4})$ that would minimize Equation (8) among the single set of aimed corresponding point candidates consisting of W different candidates as represented by the following Equation (9):

$$(x_{i,2}, y_{i,2}) = \underset{x_{i,2,dx}, y_{i,2,dy}}{\operatorname{argmin}} \{err(x_{i,1}, y_{i,1}, x_{i,2,dx}, y_{i,2,dy})\} \quad (9)$$

$$(x_{i,3}, y_{i,3}, x_{i,4}, y_{i,4}) = F(x_{i,1}, y_{i,1}, x_{i,2}, y_{i,2})$$

This aimed point $(x_{i,1}, y_{i,1})$ and $(x_{i,2}, y_{i,2})$, $(x_{i,3}, y_{i,3})$ and $(x_{i,4}, y_{i,4})$ selected are supposed to form a set of aimed corresponding points. This selected set of aimed corresponding points refers to one of the W different aimed corresponding point candidates associated with a single set of reference corresponding point candidates and should satisfy most perfectly the photometric constraint equation (Equation (5)) of the same reference corresponding point candidates.

The new candidate selecting section 107 repeatedly performs this series of processing on S sets of aimed corresponding point candidates that are associated with the single set of reference corresponding point candidates, thereby figuring out S sets of aimed corresponding points for the single set of reference corresponding point candidates. Furthermore, the new candidate selecting section 107 repeatedly performs the same type of processing on M sets of reference corresponding point candidates, thereby figuring out S sets of aimed corresponding points for each set of reference corresponding point candidates.

In the foregoing description of the new candidate selecting section 107, the corresponding point candidates on the second shot are supposed to fall within a rectangular search range (±wsx, ±wsy), which is defined with respect to the aimed point $(x_{i,1}, y_{i,1})$ on the first shot, to make the basic idea of the present invention easily understandable.

However, neither the image to put the aimed point on as a reference nor the image to define the search range on is limited to this example but any other combination may be adopted as well. For example, using the aimed point $(x_{i,1}, y_{i,1})$ on the first shot as a reference, search ranges ±wsx2 and ±wsx3 may be defined with respect to the x coordinate $x_{i,2,dx}$ on the second shot and to the x coordinate $x_{i,3,dx}$ on the third shot, respectively. In this case, if Equation (3) is modified, the y coordinates on the second and third shots and the x and y coordinates on the fourth shot $(y_{i,2,dy}, y_{i,3,dy}, x_{i,4,dx}, y_{i,4,dy})$ can be calculated. Even when such aimed corresponding point candidates are used, the new candidate selecting section 107 can also select an aimed corresponding point candidate that satisfies the photometric constraint equation (Equation (5)) most perfectly.

The reference candidate selecting section 108 receives S sets of aimed corresponding points for the M sets of reference corresponding point candidates generated by the new candidate generating section 106 and for each set of reference corresponding point candidates selected by the new candidate selecting section 107, selects a single set of reference corresponding point candidate from the S sets, and outputs the selected reference corresponding point candidates (or reference corresponding points) and their associated aimed corresponding points as the best corresponding points for the incoming images.

Now it will be described exactly how the reference candidate selecting section 108 selects one out of the M sets of reference corresponding point candidates. First, an evaluation value Em is calculated by the following Equation (10) for a set of reference corresponding point candidates:

$$Em = \sum_{i \in s} err(x_{i,1}, y_{i,1}, x_{i,2}, y_{i,2}) \quad (10)$$

Next, evaluation values are calculated for the M sets of reference corresponding point candidates, and one of those sets of reference corresponding point candidates that has the smallest evaluation value is selected as the best reference corresponding points.

Then, the reference candidate selecting section 108 outputs the single selected set of reference corresponding points and its associated single set of aimed corresponding points as new corresponding points for the fourth incoming image.

According to the procedure of operating the respective processing elements described above, multiple new corresponding points can be computed across four images. If more than four images are included in a single moving picture, the procedure described above may be repeatedly performed on one group of four images after another. In this manner, corresponding points can be computed for every incoming image.

The evaluation value Em of Equation (10) described above represents the sum of errors of the S sets of aimed corresponding points, obtained based on a single set of reference corresponding point candidates, with respect to the photometric constraint equation (Equation (5)). In addition, the respective sets of aimed corresponding points also satisfy the geometric constraint equation (Equation (3)). That is why the evaluation value Em of Equation (10) becomes a value representing to what degree a single set of reference corresponding point candidates and its associated S sets of aimed corresponding points satisfy the photometric and geometric constraint equations. Consequently, the new corresponding points consisting of the single set of reference corresponding points, selected by the reference candidate selecting section 108, and its associated S sets of aimed corresponding points make a combination that satisfies the photometric and geometric constraint equations most perfectly among the M sets of reference corresponding point candidates and their associated aimed corresponding points.

In the foregoing description, the reference candidate selecting section 108 is supposed to select a combination that satisfies the photometric and geometric constraint equations most perfectly among the M sets of reference corresponding point candidates and their associated aimed corresponding points. However, that combination does not always have to satisfy those equations most perfectly. For example, if there are multiple combinations that satisfy the photometric and geometric constraint equations to such degrees as to fall within a predetermined range among those M sets of reference corresponding point candidates and their associated aimed corresponding points, any of those combinations that satisfy the photometric and geometric constraint equations may be selected.

Consequently, even if the incoming images have been shot under varying illumination conditions and even if the initial corresponding points generated by the initial corresponding point computing section 113 contain a position error at a certain probability, reference corresponding points that satisfy the photometric and geometric constraint equations most perfectly can be selected according to this first preferred embodiment among the multiple reference corresponding point candidates that have been generated based on the initial corresponding points. This photometric constraint equation should be satisfied by the luminance values of corresponding points even between those images that have been shot under varying illumination conditions. As a result, appropriate reference corresponding point candidates and corresponding points with little positional error can be computed even for those images with varying illumination conditions.

Figure 6:
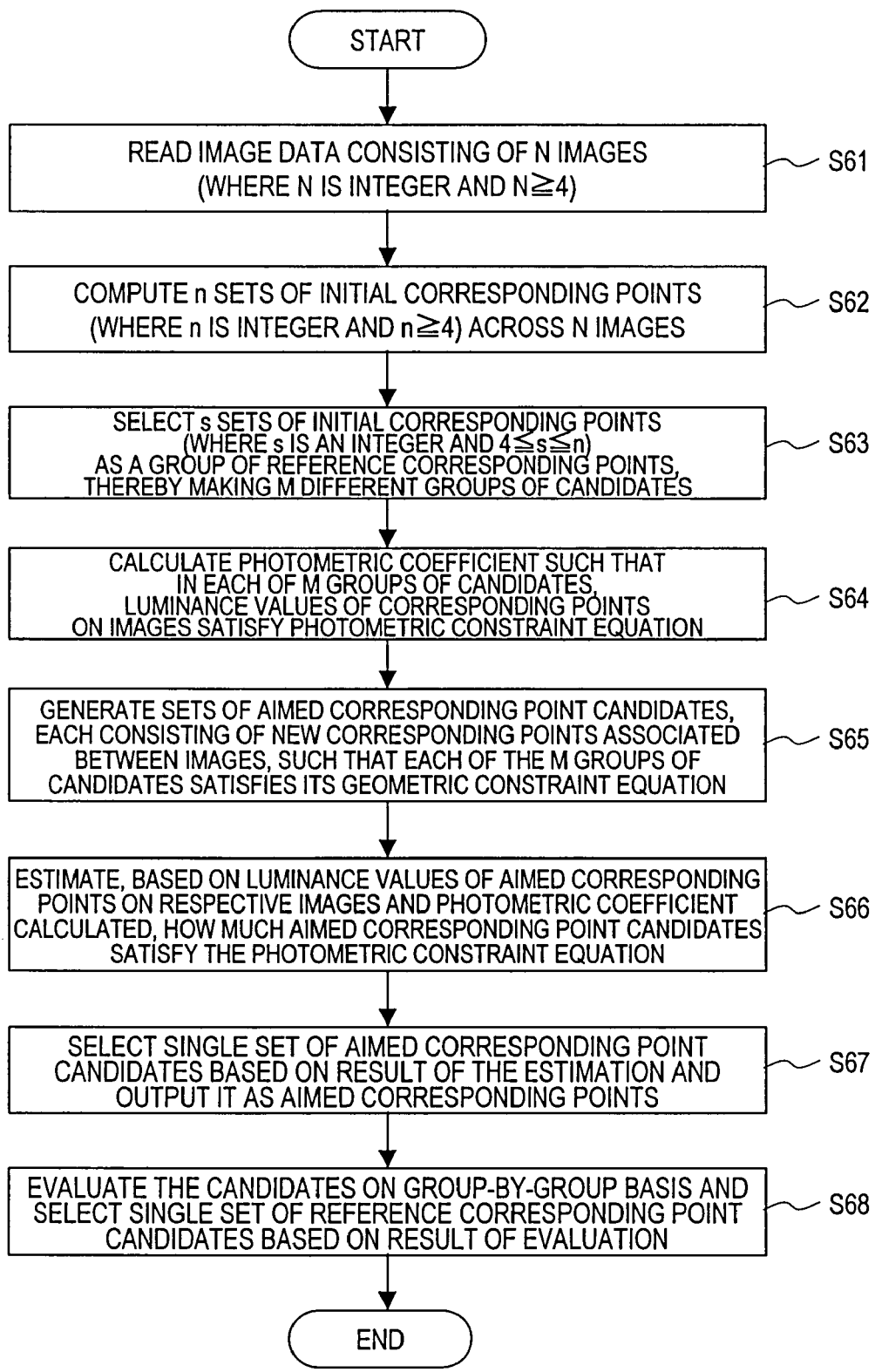
FIG. 6 is a flowchart showing the procedure in which the image processing apparatus 100 operates.

FIG. 6 is a flowchart showing the procedure in which the image processing apparatus 100 operates. The processing described above is carried out in the generalized procedure shown in FIG. 6.

First, in Step S61, the reference candidate generating section 103 reads image data, consisting of N images (where N is an integer equal to or greater than four), from the image storage section 102.

Next, in Step S62, the initial corresponding point computing section 113 computes and outputs n sets of initial corresponding points across the N images, where N is an integer equal to or greater than four. Subsequently, in Step S63, the reference candidate generating section 103 selects s sets of initial corresponding points from the n sets of initial corresponding points, where s is an integer and $4 \leq s \leq n$, thereby making M groups of different reference corresponding point candidates.

Thereafter, in Step S64, the photometric coefficient calculating section 105 calculates a photometric coefficient such that in each of the M groups of reference corresponding point candidates, luminance values of respective corresponding points on the images satisfy the photometric constraint equation.

Then, in Step S65, the new candidate generating section 106 generates S different sets of aimed corresponding point candidates, each set consisting of new corresponding points that are associated with each other between the images, such that each of the M groups of reference corresponding point candidates satisfies a geometric constraint equation that is defined for that group between the images.

Next, in Step S66, the new candidate selecting section 107 estimates, based on the luminance values of the respective aimed corresponding points on the images and the photometric coefficient calculated, how much those sets of aimed corresponding point candidates satisfy the photometric constraint equation (i.e., calculates the magnitudes of errors). Then, in Step S67, the new candidate selecting section 107 selects a single set of aimed corresponding point candidates based on a result of the estimation and outputs the set as aimed corresponding points.

Finally, in Step S68, the reference candidate selecting section 108 evaluates the reference corresponding point candidates based on the result of the estimation on a group-by-group basis, selects a single set of reference corresponding point candidates based on a result of the evaluation, and outputs the candidates as reference corresponding points.

By performing these processing steps, the image processing apparatus 100 can figure out a set of corresponding points that supports most strongly the supposition that a variation between multiple images has been caused by a relative movement of the subject and by a change of illumination conditions. As a result, even if the incoming images have been shot under mutually different illumination conditions, corresponding points can also be computed with the positional error reduced.

In the preferred embodiment described above, the reference candidate generating section 103 is supposed to generate reference corresponding point candidates by selecting one of multiple sets of initial corresponding points at random. Alternatively, after having selected multiple initial corresponding points at random, the reference candidate generating section 103 may generate four by four luminance matrices based on the luminance values of four sets of initial corresponding points for four images and may selectively output one of those luminance matrices that has the highest degree of independence.

On the conditions that the subject is a diffuse-reflecting object and that the illumination is a parallel light source, if the light source is located in four different directions in the four images with respect to the subject and if normals to the four corresponding points are independent of each other, then this four by four matrix becomes a rank 3 matrix. However, if either the light source directions between the images or the normal directions between the corresponding points are too close to each other, then the degree of its independence will decrease and the matrix may be rank 2 or less.

The degree of independence of this luminance matrix can be evaluated by computing the eigenvalues of the luminance matrix and by calculating the ratio of the largest one (which will be referred to herein as a "first eigenvalue") to the third largest one (which will be referred to herein as a "third eigenvalue"). That is to say, that ratio is represented by the condition. The greater this ratio, the higher the degree of independence. A reference corresponding point candidate having a luminance matrix with a high degree of independence will ensure greater accuracy when the photometric constraint equation is calculated by Equation (5) than a reference corresponding point candidate having a luminance matrix with a low degree of independence. That is why if reference corresponding point candidate having a luminance matrix with a high degree of independence is used, corresponding points with small positional error can be computed with more probability.

In the preferred embodiment described above, the reference candidate generating section 103 is supposed to generate reference corresponding point candidates as four sets of initial corresponding points by selecting them from multiple initial corresponding points at random.

Alternatively, in generating reference corresponding point candidates, multiple initial corresponding points may be selected at random, a four by four luminance matrix may be generated based on the luminance values of four sets of corresponding points across four frames, and then a set of initial corresponding points, which has a luminance matrix where the ratio of the third eigenvalue to the first eigenvalue is smaller than a predetermined value, may be excluded from the reference corresponding point candidates. As described above, if the ratio of the third eigenvalue to the first eigenvalue is small in a luminance matrix, the accuracy will decrease when the photometric constraint equation is calculated by Equation (5). Thus, by excluding such reference corresponding point candidates, corresponding points with small positional error can be computed with more probability. Specifically, the predetermined value may be 0.01, for example. That is to say, if the ratio of the third eigenvalue to the first eigenvalue is smaller than 0.01, the set of initial corresponding points may be excluded from the reference corresponding point candidates. As described above, if either the light source directions between the images or the normal directions between the corresponding points are too close to each other, then the degree of its independence will decrease and the matrix may be rank 2 or less. However, as every actually measured luminance value will contain very small error, the ratio of the third eigenvalue to the first eigenvalue rarely becomes equal to zero. That is why by removing the set of initial corresponding points from the reference corresponding point candidates if the ratio is smaller than the predetermined value, reference corresponding point candidates that are rank 2 or less can be substantially excluded. As a result, the reference corresponding point candidates with an increased degree of independence can be generated and corresponding points with small positional error can be computed with more certainty.

Also, instead of selecting multiple initial corresponding point candidates at random, initial corresponding points, around which respective color pictures have a lower degree of correlation, may be selected preferentially to generate reference corresponding point candidates. Suppose each incoming image consists of color pictures represented in the three primary colors of red (R), green (G) and blue (B). In that case, with respect to a small area image around each set of corresponding points, the degree of correlation between the luminance values of G and R pictures or between those of G and B pictures is calculated. And corresponding points, including ones with a low degree of correlation between the color pictures, are selected preferentially. As used herein, the "degree of correlation between color pictures" may be evaluated by using the spatial gradient of the luminances of images, for example.

The two major factors that will cause the spatial gradient of luminances in an image are a texture at the surface of a subject and a luminance variation due to the unevenness of a subject's surface. If the directions that a light source faces have changed, the luminances of the texture at the subject's surface will vary at the same rate within a small area but the variation in luminance due to the unevenness of the subject's surface will occur locally. That is why if the spatial gradient of luminances is the same in a small area including a group of pixels located around a certain center pixel (e.g., within five pixels away from the center pixel) due to the texture, the corresponding points would have less positional error compared to a situation where the spatial gradient is determined by the unevenness of the subject's surface. Furthermore, if the luminances vary due to the unevenness of the subject's surface, then the luminances will vary evenly for the respective colors and the degree of correlation will increase between the R, G and B pictures in the small area. That is why the corresponding points, of which the color pictures have a lower degree of correlation, would have less positional error even when computed by the conventional corresponding point computing method. For that reason, if reference corresponding point candidates are generated by selecting such initial corresponding points preferentially from among the given initial corresponding points, then corresponding points with less positional error could be computed eventually with more certainty.

If there is a steep spatial gradient of luminance values in a small area, then there is a significant difference between the luminances. That is why even if the subject changes its angles as a variation occurs in the images, that small area could be located easily. For that reason, by selecting preferentially pixels in a small area with a steep spatial gradient as reference corresponding point candidates, corresponding points with less positional error can be computed with more certainty.

In the preferred embodiment described above, the respective processing elements that form the corresponding point recomputing section 104 are supposed to repeatedly perform the same series of processing described above on four images among multiple incoming images. In processing the fifth image and the ones that follow it, however, the new candidate generating section 106 may compute the aimed corresponding point candidates by Equation (4), for example. It should be noted that the processing of computing corresponding points for the fifth image and the ones that follow it in a situation where corresponding points are already known for the previous four images is well known in the art, and the description thereof will be omitted herein. For example, the processing technique disclosed by A. Shashua in "Geometry and Photometry in 3D Visual Recognition", Ph. D Thesis, pp. 107-124, Dept. Brain and Cognitive Science, MIT (1992) may be adopted.

Also, in the preferred embodiment described above, the reference corresponding point candidates are supposed to consist of four sets of initial corresponding points (i.e., s=4). However, the number of sets of initial corresponding points to use does not have to be four. Even if five or more sets of initial corresponding points (i.e., $s \geq 5$) are used, the coefficients for Equations (3) and (4) can also be calculated by the minimum square method and the same series of processing as the one described above may also be carried out. Besides, by calculating the coefficients by applying the minimum square method to the five or more sets of initial corresponding points, the influence of noise can be reduced effectively.

Furthermore, the photometric coefficient calculating section 105 is supposed to calculate the photometric coefficient by using the luminance values of incoming images as the coordinate values of respective corresponding points in the reference corresponding point candidates. Alternatively, the photometric coefficient may also be calculated by using luminance values, which are obtained by subjecting the incoming images to a spatial low pass filter, according to the point-to-point distance of the reference corresponding points between the images. In the incoming images described above, the distance of the subject from the camera varies from one image after another, and therefore, each of the corresponding points in the reference corresponding point candidates has a different pixel area at the subject's surface from one image after another, too. For that reason, the photometric constraint equation (Equation (5)), which should represent the luminance value of the same point at the subject's surface, will contain some error.

To reduce the error, the corresponding points should have as uniform a one-pixel-equivalent area at the subject's surface as possible between multiple incoming images. For example, if a pixel value obtained by processing one of the multiple incoming images, which has a relatively small one-pixel-equivalent area at the subject's surface, with a low pass filter having a lower cutoff frequency, is used as a pixel value for the corresponding points, the error of the photometric constraint equation can be reduced. However, the one-pixel-equivalent area at the subject's surface cannot be calculated directly. Meanwhile, the greater the point-to-point distance between the reference corresponding points, the smaller the one-pixel-equivalent area at the subject's surface would be.

Thus, by calculating the average of the point-to-point distances between the corresponding points in the reference corresponding point candidates one incoming image after another and by processing the incoming images with a low pass filter having a cutoff frequency corresponding to their ratio, the one-pixel-equivalent areas at the subject's surface can be made more uniform between the multiple incoming images. As a result, the error of the photometric constraint equation can be reduced and the accuracy of the corresponding points can be increased effectively.

Instead of using the point-to-point distances, another method may also be adopted to reduce the error of the photometric constraint equation. If information about a zoom ratio such as the subject's distance or a focal length is added to image data as in the Exif standard, then information about the one-pixel-equivalent area at the subject's surface may also be figured out and a low pass filter may have its cutoff frequency defined based on that zoom ratio information. By using such zoom ratio information, even if the subject on multiple images have different zoom ratios, the one-pixel-equivalent areas at the subject's surface can be made more uniform between the multiple incoming images. As a result, the error of the photometric constraint equation can be reduced.

Embodiment 2

Figure 7:
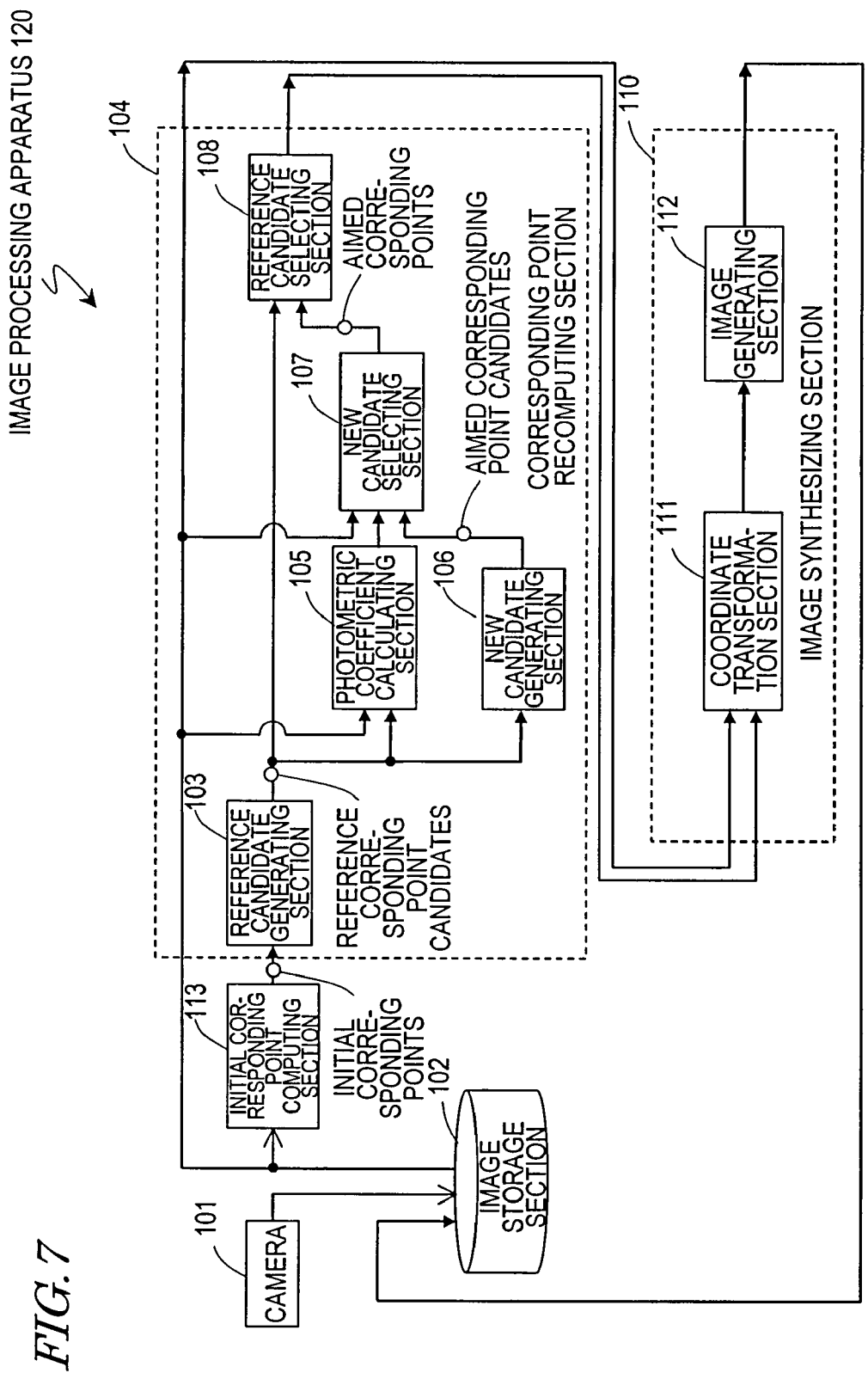
FIG. 7 shows an arrangement of functional blocks in an image processing apparatus 120 as a second preferred embodiment of the present invention.

FIG. 7 shows an arrangement of functional blocks in an image processing apparatus 120 as a second preferred embodiment of the present invention. Unlike the image processing apparatus 100 of the first preferred embodiment described above, the image processing apparatus 120 of the second preferred embodiment includes an image synthesizing section 110 instead of the output section 109 of the image processing apparatus 100. The image synthesizing section 110 receives multiple images and corresponding points that have been defined across those images and outputs a synthetic image having a higher resolution than any of the incoming images. As used herein, "to have a high resolution" means having high spatial frequency components in an image representing the same area of the subject.

Hereinafter, the image synthesizing section 110 will be described in detail. Any component of the image processing apparatus 120 shown in FIG. 7, having the same function as the counterpart of the image processing apparatus 100 shown in FIG. 1, is identified by the same reference numeral as the one used in FIG. 1 and the description thereof will be omitted herein.

The image synthesizing section 110 includes a coordinate transformation section 111 and an image generating section 112.

The coordinate transformation section 111 receives multiple images and their corresponding points, thereby generating coordinate transformed images based on those images. As used herein, a "coordinate transformed image" refers to an image that has the same relative coordinate locations (i.e., the same composition) as, and a greater image size than, one of those images received. The coordinate transformation section 111 generates multiple coordinate transformed images for each image and outputs those coordinate transformed images as a set.

The image generating section 112 receives multiple sets of coordinate transformed images, calculates a transform coefficient, which is the order of photometric constraint equation to be satisfied by the luminance values of pixels at the same location, based on those coordinate transformed images on a set-by-set basis, and linearly combines those coordinate transformed images with the transform coefficient, thereby generating and outputting a synthetic image.

Hereinafter, it will be described how the image processing apparatus 120 works. The same processing as the one already described for the first preferred embodiment is carried out until the images and their corresponding points are output from the corresponding point recomputing section 104, and the description thereof will be omitted herein. And the operation of the image processing apparatus 120 will start to be described with the output processing of the corresponding point recomputing section 104. Also, the N incoming images supplied from the corresponding point recomputing section 104 are identified by (where j=1, . . . and N), the n sets of corresponding points across those incoming images are identified by $p_{i,j}$ (where i=1, . . . and n and j=1, . . . and N), and the coordinates of their images are identified by $(x_{i,j}, y_{i,j})$ (where i=1, . . . and n and j=1, . . . and N).

Figure 8:
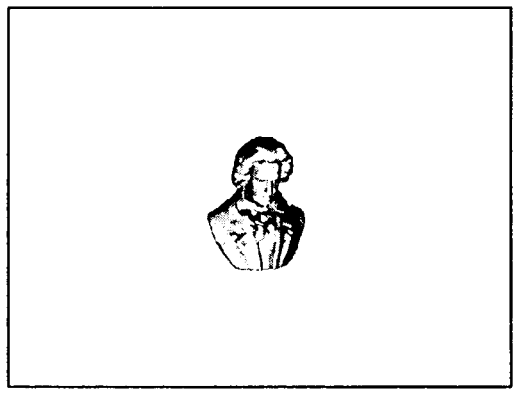
FIG. 8 shows examples of incoming images in the second preferred embodiment.
Figure 8:
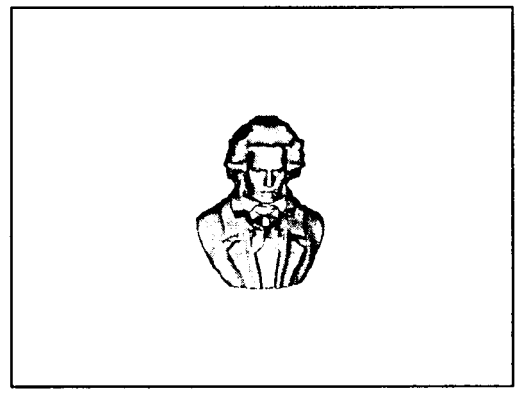
Figure 8:
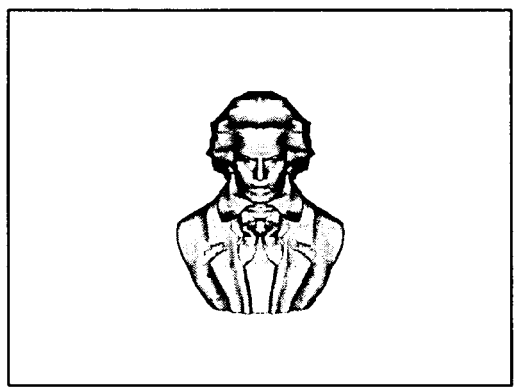
Figure 8:
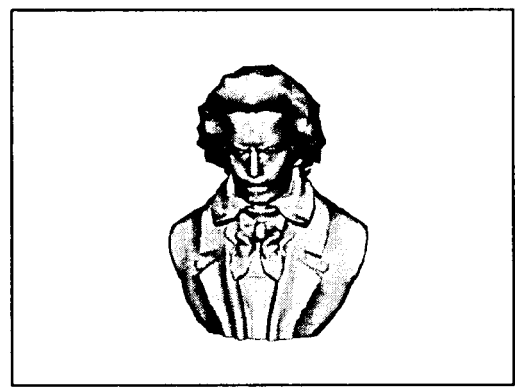
Figure 8:
Figure 8:

FIG. 8 shows examples of incoming images according to this preferred embodiment. In this example, the number of incoming images is supposed to be six (i.e., N=6) and the dimensions of each of those incoming images are supposed to be 640 pixels×480 pixels. Also, in the following description, the corresponding points $p_{i,j}$ are supposed to be present on the subject (which is a bust in this example).

The coordinate transformation section 111 receives image data consisting of multiple images and their corresponding points and subjects those images to coordinate transformation, thereby generating a number of coordinate transformed images having the same composition as the incoming ones. As used herein, "to have the same composition" means that the relative coordinate location of the subject remains the same in all of those images.

Also, in a coordinate transformed image having the same composition as a certain incoming image $I_k$, each of its coordinate locations can be computed by magnifying its associated coordinate location on the incoming image $I_k$ with a zoom ratio r. This zoom ratio r is a ratio of lengths and is supposed to be specified by the user in advance.

Hereinafter, it will be described in detail how the coordinate transformation section 111 operates. In the following example, the operation of generating multiple coordinate transformed images $I_{k,j}$ having the same composition as a single incoming image $I_k$ by using multiple incoming images $I_j$ (where j=1, . . . and N) and corresponding points $p_{i,j}$ (where i=1, . . . and n and j=1, . . . and N) will be described.

Specifically, the coordinate transformation section 111 multiplies the image coordinates $(x_{i,j}, y_{i,j})$ of the corresponding points $p_{i,k}$ (where i=1, ... and n) of a single incoming image $I_k$ by the zoom ratio r and uses the coordinate values thus obtained as common corresponding points $q_{i,k}=(r \cdot x_{i,k}, r \cdot y_{i,k})$ (where i=1, ... and n) for the multiple coordinate transformed images $I_{k,j}$ (where j=1, ... and N).

Furthermore, the coordinate transformation section 111 performs texture mapping on the corresponding points $q_{i,k}$ (where i=1, ... and n) for the coordinate transformed images, the respective corresponding points $p_{i,j}$ (where i=1, ... and n and j=1, ... and N) and the respective incoming images $I_j$ (where j=1, ... and N), thereby generating a number of coordinate transformed images $I_{k,j}$ (where j=1, ... and N).

Hereinafter, an exemplary method for generating a coordinate transformed image $I_{k,j}$ by texture mapping will be described. First of all, the n corresponding points $p_{i,k}$ (where i=1, ... and n) of the incoming image $I_k$ are grouped into multiple triangles by the Delaunay triangulation method. Then, the coordinate values of pixels within each triangle on a coordinate transformed image are supposed to be obtained by subjecting the coordinate values of corresponding pixels within its associated triangle on the incoming image to an affine transformation. In this manner, the correlation between the coordinate values of an arbitrary pixel on the coordinate transformed image and those of its corresponding pixel on the associated incoming image can be defined. As a result, a coordinate transformed image can be generated by using, as the value of a pixel on the coordinate transformed image, the value of its corresponding pixel on its associated incoming image. Such a method for generating a synthetic image by applying texture mapping to images and corresponding points is widely known as a computer graphic technique and a detailed description thereof will be omitted herein.

Furthermore, the coordinate transformation section 111 calculates the ratio of the subject's area in each coordinate transformed image $I_{k,j}$ (where j=1, ... and N) to the subject's area in its associated incoming image $I_j$ (where j=1, ... and N) as an area ratio $s_{k,j}$ (where j=1, ... and N) and outputs the ratio. In this manner, the subject's area ratio can be calculated as the ratio of the subject's area in a coordinate transformed image to the one in its associated incoming image.

In those coordinate transformed images $I_{k,j}$ (where j=1, ... and N) that have been generated in this manner, the two-dimensional coordinate location (i.e., the composition) of the subject remains the same as in the incoming image $I_k$. However, as a pixel value of each coordinate transformed image $I_{k,j}$ (where j=1, ... and N) has been generated based on the pixel values of multiple incoming images $I_j$ (where j=1, ... and N), the illumination conditions after the transformation are different the ones before the transformation. On top of that, each coordinate transformed image $I_{k,j}$ (where j=1, ... and N) is characterized in that its coordinate values are r times as large as those of the incoming image $I_k$ (i.e., the image has had its size increased).

By performing the operation described above, the coordinate transformation section 111 generates a set of coordinate transformed images $I_{k,j}$ (where j=1, ... and N) having the same composition as one incoming image $I_k$. Furthermore, by repeatedly performing the operation described above, the coordinate transformation section 111 generates and outputs multiple sets of incoming images $I_k$ (where k=1, ... and N) and coordinate transformed images $I_{k,j}$ (where k=1, ... and N and j=1, ... and N).

FIG. 8 shows an exemplary set of six images $I_j$. These images were shot under mutually different illumination conditions. Each of these images has 640×480 pixels.

Figure 9:
FIG. 9 shows examples of coordinate transformed images $I_{3,j}$ with the same composition as the single incoming image $I_3$ shown in FIG. 8(c).
Figure 9:
Figure 9:
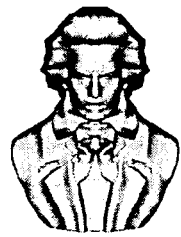
Figure 9:
Figure 9:
Figure 9:

FIG. 9 shows an exemplary set of coordinate transformed images $I_{3,j}$ having the same composition as a particular incoming image $I_3$ (i.e., k=3) shown in FIG. 8(c). In this preferred embodiment, the zoom ratio r is supposed to be two. The coordinate transformed images thus generated have a picture size of 1,280×960 pixels.

As can be seen easily from FIGS. 9(a) through 9(f), the six coordinate transformed images $I_{3,j}$ shown in FIG. 9 have the same composition as, different illumination conditions from, and a bigger picture size than, the incoming image $I_3$ shown in FIG. 8(c).

The coordinate transformation section 111 generates multiple sets of coordinate transformed images $I_{j,k}$ (where k=1, ... and N) such as the one shown in FIG. 9 for each incoming image $I_k$ (where k=1, ... and N) and calculates and outputs the area ratios $r_{k,j}$.

The image generating section 112 receives the multiple sets of coordinate transformed images $I_{k,j}$ and the area ratios $r_{k,j}$ and calculates the coefficient (i.e., transform coefficient) of the photometric constraint equation to be satisfied by the luminance values of pixels at the same coordinate location on those coordinate transformed images for each set.

Hereinafter, it will be described exactly how the image generating section 112 calculates the transform coefficient.

Specifically, the image generating section 112 receives the coordinate transformed images $I_{k,j}$ and the area ratios $r_{k,j}$ and selects three coordinate transformed images, of which the area ratios $r_{k,j}$ (where j=1, ... and N) are the smallest, the second smallest and third smallest, respectively, from each set. In this example, those three coordinate transformed image selected are identified by $I_{k,a}$, $I_{k,b}$ and $I_{k,c}$, respectively, and their pixel values at an arbitrary point pi are identified by $I_{k,a}(p_i)$, $I_{k,b}(p_i)$ and $I_{k,c}(p_i)$, respectively. In this case, the pixel value $I_{k,k}(p_i)$ of a coordinate transformed image $I_{k,k}$, which is an enlarged one of the incoming image $I_k$, and the pixel values $I_{k,a}(p_i)$, $I_{k,b}(p_i)$ and $I_{k,c}(p_i)$ satisfy the photometric constraint equation represented by the following Equation (11):

$$I_{k,k}(p_i)=D_{k,a}I_{k,a}(p_i)+D_{k,b}I_{k,b}(p_i)+D_{k,c}I_{k,c}(p_i) \qquad (11)$$

where $D_{k,a}$, $D_{k,b}$ and $D_{k,c}$ (which will be collectively identified herein by $D_k$) are transform coefficients.

Each of these transform coefficients $D_k$ can be calculated based on the pixel values of three or more points $p_i$ on multiple coordinate transformed images. In principle, Equation (11) is satisfied in a situation where the coordinate transformed images $I_{k,k}$, $I_{k,a}$, $I_{k,b}$ and $I_{k,c}$ have the same resolution. Actually, however, not every set of coordinate transformed images has the same resolution, and therefore, Equation (11) may contain errors. Thus, according to this preferred embodiment, the transform coefficient $D_k$ is generated by applying the minimum square method to the pixel values of a lot of points $p_i$, of which the number is far greater than three.

In the example illustrated in FIG. 9, the six coordinate transformed images $I_{3,j}$ have the same subject's area. Meanwhile, the six incoming images shown in FIG. 8 have their subject's areas decreased in the order of $I_6$, $I_5$, $I_4$, $I_3$, $I_2$ and $I_1$. That is why the area ratios $s_{3,k}$ increase in the order of $s_{3,6}$, $s_{3,5}$, $s_{3,4}$, $s_{3,3}$, $s_{3,2}$ and $s_{3,1}$. Consequently, the transform coefficient $D_3$ is calculated based on the coordinate transformed images $I_{3,3}$, $I_{3,4}$, $I_{3,5}$ and $I_{3,6}$.

Next, the image generating section 112 substitutes the transform coefficient $D_k$ and the coordinate transformed image $I_{k,j}$ into the following Equation (12), thereby generating a linear image $I'_k$:

$$I'_k(p_i)=D_{k,a}I_{k,a}(p_i)+D_{k,b}I_{k,b}(p_i)+D_{k,c}I_{k,c}(p_i) \qquad (12)$$

The linear image $I'_k$ generated by the linear combination represented by Equation (12) sometimes has the same composition and same illumination conditions as, but a higher resolution than, the coordinate transformed image $I_{k,k}$, which is an enlarged version of the incoming image $I_k$.

For example, in the six incoming images shown in FIG. 8, the subject's areas of the incoming images $I_4$, $I_5$ and $I_6$ are greater than that of the incoming image $I_3$, and therefore, the incoming images $I_4$, $I_5$ and $I_6$ have higher resolutions than the incoming image $I_3$. On the other hand, the six coordinate transformed images $I_{3,j}$ shown in FIG. 9 have the same subject's area. For that reason, the coordinate transformed images $I_{3,4}$, $I_{3,5}$ and $I_{3,6}$ shown in FIGS. 9(d), 9(e) and 9(f) and generated from the incoming images $I_4$, $I_5$ and $I_6$, respectively, have higher resolutions than the coordinate transformed image $I_{3,3}$ shown in FIG. 9(c) and generated from the incoming image $I_3$ (where k=3). As a result, the linear image $I'_3$ generated by linearly combining the coordinate transformed images $I_{3,4}$, $I_{3,5}$ and $I_{3,6}$ by Equation (12) has a higher resolution than the coordinate transformed image $I_{3,3}$.

Conversely, a linear image $I'_6$ to be generated based on a plurality of coordinate transformed images $I_{6,j}$ (where j=1, ... and N) having the same composition as the incoming image $I_6$ (where k=6) shown in FIG. 8(f) would have a lower resolution than the coordinate transformed image $I_{6,6}$. This is because none of the multiple incoming images $I_j$ has a higher resolution than the incoming image $I_6$.

That is why the image generating section 112 analyzes the spatial frequency components of the linear image $I'_k$ and the coordinate transformed image $I_{k,k}$, selects one of these two images that has the greater number of high frequency components, and stores it as a synthetic image $I''_k$ in the image storage section 102. The synthetic image $I''_k$ obtained by performing these operations has the same composition and same illumination conditions as, but a resolution that is equal to or higher than, the incoming image $I_k$.

Figure 10:
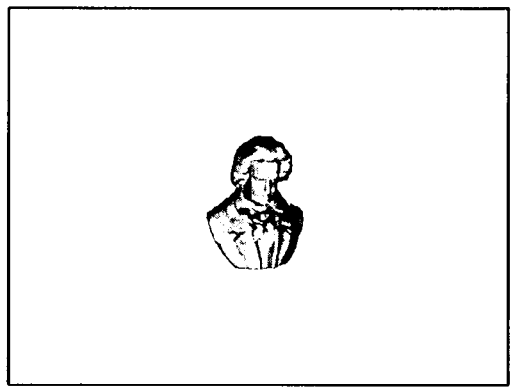
FIG. 10 shows examples of synthetic images generated by the image processing apparatus 120 of the second preferred embodiment.
Figure 10:
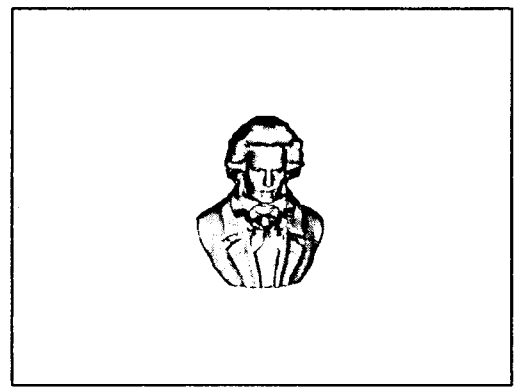
Figure 10:
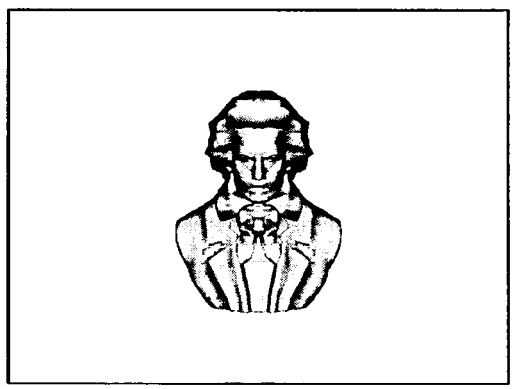
Figure 10:
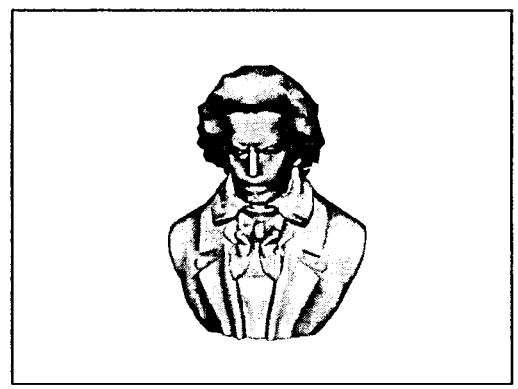
Figure 10:
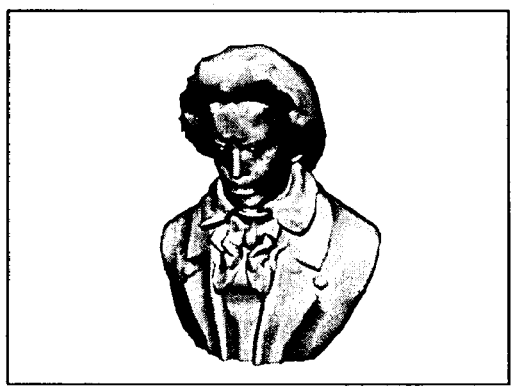
Figure 10:

FIG. 10 shows examples of synthetic images generated by the image processing apparatus 120 of this preferred embodiment. FIG. 11(a) is an enlarged view of the synthetic image shown in FIG. 10(c), while FIG. 11(b) is an enlarged view of the incoming image shown in FIG. 8(c). It can be seen that the synthetic image shown in FIG. 11(a) has a higher resolution than the incoming image shown in FIG. 11(b).

Figure 11:
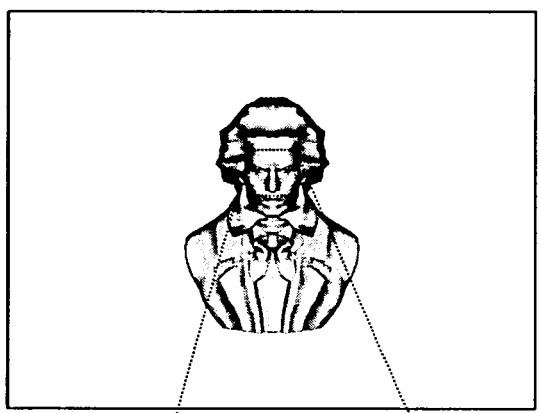
FIG. 11(a) is an enlarged view of the synthetic image shown in FIG. 10(c) and FIG. 11(b) is an enlarged view of the incoming image shown in FIG. 8(c).
Figure 11:
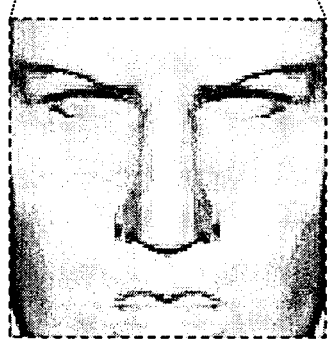
Figure 11:
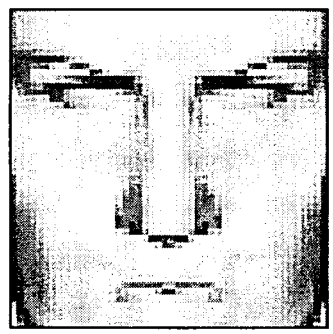

As described above, multiple images (shown in FIG. 8), which have been shot with the relative positions of the subject, camera and light source changed, are received and a synthetic image with an increased resolution is generated as shown in FIG. 11. In particular, by using information about a subject's image with a relatively high resolution (such as the one shown in FIG. 8(f)) among multiple images in which the subject is located at mutually different distances from the camera, a synthetic image with an increased resolution could be generated.

According to the processing method described above, in an image yet to be synthesized and another image, which represents the subject with a relatively high resolution and will be used for synthesis, the subject and the light source have different relative positions. That is why it is important how to compute corresponding points with the positional error minimized.

Figure 12:
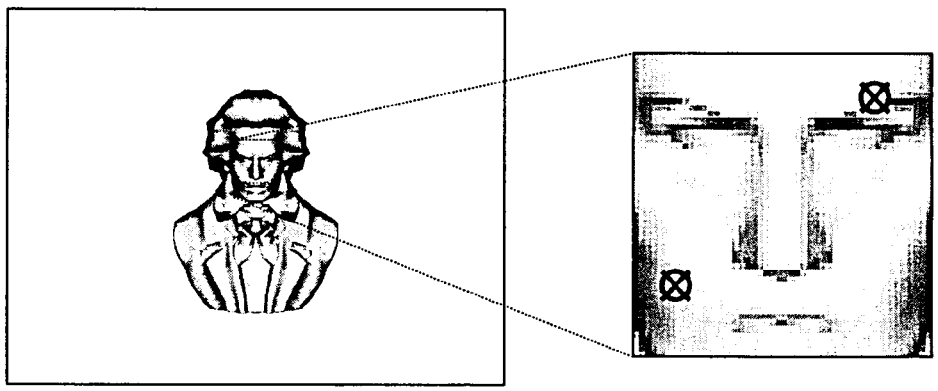
FIG. 12(a) shows, in comparison, corresponding points obtained by a conventional method of computing corresponding points and ones obtained by a method of computing corresponding points according to the present invention.
FIG. 12(b) shows an exemplary synthetic image that has been generated based on corresponding points with a lot of positional error.
FIG. 12(c) shows an exemplary synthetic image that has been generated based on corresponding points with little positional error.
Figure 12:
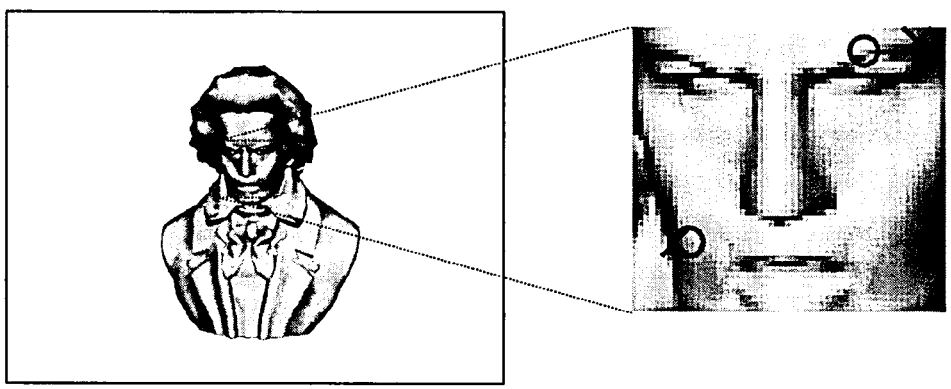
Figure 12:
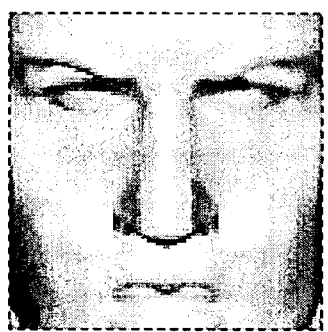
Figure 12:
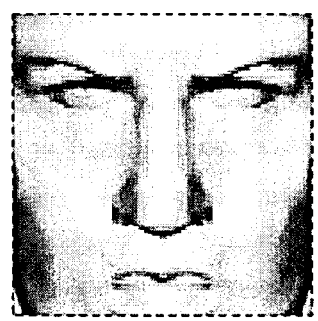

FIG. 12(a) shows, in comparison, corresponding points obtained by a conventional corresponding point computing method and ones obtained by a corresponding point computing method according to the present invention.

In the two incoming images shown in FIG. 12(a), the corresponding points obtained by the conventional corresponding point computing method are indicated by the crosses x. According to the conventional method in which corresponding points are computed using, as an evaluation value, either a difference in luminance or a the degree of correlation between rectangular areas of images, it is difficult to accurately compute corresponding points between multiple images in which the surface of the subject has varying luminances.

If the image synthesizing section 110 generated a synthetic image using such corresponding points with a lot of positional error, the resolution of the subject would not increase or a portion of the resultant synthetic image could contain erroneous luminances, which is a problem.

FIG. 12(b) shows an example of a synthetic image that has been generated using corresponding points with a lot of positional error. The left eye and its surrounding area of the subject's synthetic image are blurred due to a misalignment between the corresponding points. Also, the right-side of the jaw of the subject's image has a lot of luminance error (i.e., is darkened) due to the misalignment.

The corresponding point computing method of the present invention, however, can handle such problems well enough. This is because as already described in detail for the image processing apparatus 100 of the first preferred embodiment, by adopting the technique of selecting reference corresponding points that satisfy the photometric and geometric constraint equations, even if the subject has changed its relative positions with respect to the light source (i.e., even if the illumination conditions have changed), corresponding points can still be computed with the positional error reduced sufficiently.

In FIG. 12(a), the corresponding points computed by the image processing apparatus 120 of this preferred embodiment are indicated by the open circles ○. It can be seen that even if the surface of the subject has changed its luminances, corresponding points between the images can still be computed accurately.

The image synthesizing section 110 of the image processing apparatus 120 makes geometric deformation to produce a synthetic image and then generates a synthetic image using the same photometric constraint equation. FIG. 12(c) shows an example of a synthetic image that has been generated based on corresponding points with small positional error. In this manner, by using such corresponding points that have been computed so as to satisfy the photometric and geometric constraint equations, a synthetic image with small luminance error, small positional error and a high resolution can be generated as shown in FIG. 12(c).

In the foregoing description of the first and second preferred embodiments of the present invention, the geometric and photometric constraint equations are derived on the premises that (1) the subject of shooting is a rigid body; (2) light rays are incident on the subject parallel to each other; (3) the light rays are diffuse-reflected from the surface of the subject; and (4) an image of the subject is shot with an affine camera. However, these are just conditions to be met to derive those constraint equations mathematically, and do not always have to be satisfied perfectly in carrying out the present invention as an image processing apparatus, an image processing method, or whatever.

For instance, the subject is supposed to be a rigid body in the foregoing description, but does not have to be one in a strict sense. Even if the subject causes a local deformation between multiple image shots but if the magnitude of that local deformation of the subject is sufficiently small compared to the distance of relative movement of the subject with respect to the camera, the subject can still be approximated as a rigid body. That is why the processing method described above can also be adopted in that case, too. Likewise, the light rays impinging on the subject do not have to be exactly parallel to each other or do not have to be totally diffuse-reflected from the surface of the subject, either.

Also, in the first and second preferred embodiments of the present invention described above, only one subject is supposed to be represented by the image data and multiple corresponding points, including initial corresponding points, reference corresponding points and aimed corresponding points, are all located on the same subject. However, even if multiple objects are captured in the image data, those objects can also be regarded as forming a single rigid body unless their relative positions change. That is why if a number of subjects are represented by the image data and if their relative positions do not change, those subjects can also be regarded as forming a single subject and processed just as described above.

Furthermore, if a number of subjects are represented by the image data and if their relative positions do change, then the corresponding points to be computed and output by the corresponding point recomputing section 104 should be located on only one of those subjects. This is because if multiple corresponding points were located on a number of rigid bodies (or subjects), of which the relative positions do change, then those corresponding points should not satisfy the geometric constraint equation (Equation (3)). That is why in a situation where a number of subjects are represented by the image data and their relative positions do change, every time the series of operations as described for the first and second preferred embodiments of the present invention are performed once, corresponding points can be generated and the resolution of the image can be increased on just one of those multiple subjects. After that, if the image area including those corresponding points generated by performing the series of operations once is removed and then the same series of processing is carried out all over again on another image area, corresponding points can be generated and the resolution of the image can be increased on another one of those multiple subjects. Consequently, even if multiple subjects are represented by the image data, that data can also be processed just as described for the first and second preferred embodiments of the present invention.

In the foregoing description of preferred embodiments, the image processing apparatus of the present invention has been described using the functional blocks shown in FIG. 1 or 7. Those functional blocks may be implemented as either a piece of hardware, e.g., a single semiconductor chip or IC such as a digital signal processor (DSP), or a combination of a computer and software (i.e., a computer program).

Figure 13:
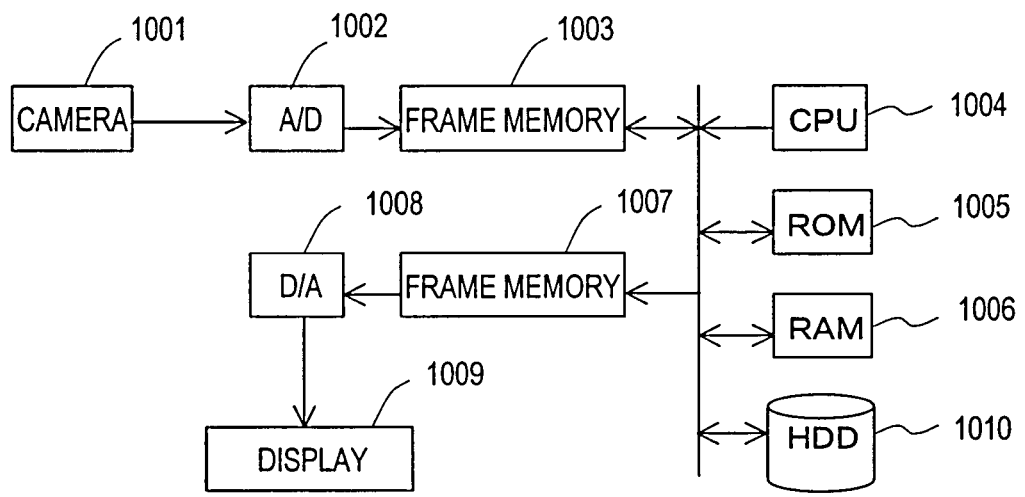
FIG. 13 shows a hardware configuration for an image processing apparatus, which is implemented as a computer.

For example, FIG. 13 shows a hardware configuration for an image processing apparatus that is implemented as a computer.

The functional blocks shown in FIGS. 1 and 7 and the hardware shown in FIG. 13 may have the following correspondence. Specifically, the camera 101 shown in FIGS. 1 and 7 corresponds to the camera 1001 and A/D converter 1002 shown in FIG. 13. The image storage section 102 shown in FIGS. 1 and 7 corresponds to the frame memory 1003 or hard disk drive (HDD) 1010 shown in FIG. 13. The functions of the initial corresponding point computing section 113 and corresponding point recomputing section 104 shown in FIGS. 1 and 7 are performed by getting a computer program executed by the CPU 1004 shown in FIG. 13. Likewise, the function of the image synthesizing section 110 shown in FIG. 7 is also performed by getting a computer program executed by the CPU 1004 shown in FIG. 13. The output section 109 shown in FIG. 1 may be implemented in various manners. For example, if the output data is passed to another program (such as a photometric image stabilization program or an encoding program), then the output section 109 may be the RAM 1006 shown in FIG. 13.

The computer program to make the computer shown in FIG. 13 work may be stored in a ROM 1005, for example. That computer program is read and extracted on the RAM 1006 by the CPU 1004 as a processor. Then, the CPU 1004 executes the respective coded instructions, which constitute the substance of the computer program.

It should be noted that the computer program could be described in the procedure of the flowchart shown in FIG. 6, for example. The computer program may be stored not just in the ROM 105, which is a semiconductor memory, but also on an optical disc or a magnetic disk as well. Alternatively, the computer program may also be transmitted over a wired or wireless network or as a radio wave and then installed in the RAM 1006 of the computer.

Industrial Applicability

The image processing apparatus of the present invention can be used effectively to improve the quality of an image captured with a camera, encode a moving picture, and recognize the shape of a subject in an image. The apparatus may be either used as an independent image processor or built in a camera or a display monitor.

The invention claimed is:

1. An image processing apparatus comprising:
an initial corresponding point computing section for computing, based on image data representing a number N of images, n sets of initial corresponding points across the N images, where N and n are both integers, $N \geq 4$ and $n \geq 4$;
a reference candidate generating section for selecting reference corresponding point candidates from the n sets of initial corresponding points to make M groups of reference corresponding point candidates such that each of the M groups is made up of s sets of initial corresponding points, where M and s are both integers, $M \geq 2$ and $4 \leq s \leq n$;
a coefficient calculating section for calculating photometric coefficient as a coefficient for a photometric constraint equation such that in each of the M groups of reference corresponding point candidates, luminance values of respective points on the images satisfy the photometric constraint equation;
a new candidate generating section for generating multiple sets of aimed corresponding point candidates, each said set being comprised of new corresponding points that are associated with each other between the images, such that each of the M groups of reference corresponding point candidates satisfies a geometric constraint equation that is defined for that group between the images;
a first selecting section for estimating, based on the luminance values of the respective points on the images and the photometric coefficient calculated, how much those sets of aimed corresponding point candidates satisfy the photometric constraint equation and selecting a single set of aimed corresponding point candidates based on a result of the estimation and outputting the set as aimed corresponding points; and
a second selecting section for evaluating the M groups of reference corresponding point candidates based on the result of the estimation obtained by the first selecting section, selecting a single set of reference corresponding point candidates from the M groups based on a result of the evaluation, and outputting the selected single set of reference corresponding point candidates and aimed corresponding points associated with the selected candidates as corresponding points across the N images.

2. The image processing apparatus of claim 1, wherein the reference candidate generating section estimates the degree of independence of an N×s luminance matrix, comprised of the luminance values of the selected s sets of initial corresponding points on the N images, and selects the M groups of reference corresponding point candidates based on a result of the estimation.

3. The image processing apparatus of claim 2, wherein the reference candidate generating section uses the ratio of a third eigenvalue to a first eigenvalue of the N×s luminance matrix as an estimated value and starts selecting the reference corresponding point candidates sequentially from a group of s initial corresponding points that is associated with an N×s luminance matrix that has produced the greatest estimated value.

4. The image processing apparatus of claim 2, wherein if the ratio of a third eigenvalue to a first eigenvalue of the N×s luminance matrix is smaller than a predefined threshold value, the reference candidate generating section excludes the s sets of initial corresponding points, associated with the N×s luminance matrix, from the reference corresponding point candidates.

5. The image processing apparatus of claim 1, wherein the reference candidate generating section estimates the magnitudes of spatial gradients of the luminance values in the vicinity of the points on the respective images with respect to the selected s sets of initial corresponding points and selects the s sets of initial corresponding points with the greatest spatial gradient preferentially as the reference corresponding point candidates.

6. The image processing apparatus of claim 1, wherein the N images are color pictures, and wherein the reference candidate generating section estimates a degree of correlation between the color pictures in the vicinity of the points on the respective images with respect to the selected s sets of initial corresponding points and selects the s sets of initial corresponding points with the lowest degree of correlation preferentially as the reference corresponding point candidates.

7. The image processing apparatus of claim 1, wherein the coefficient calculating section applies a spatial low pass filter, of which the cutoff frequency is determined by either a point-to-point distance between the points on the respective images or a zoom ratio of a subject on the respective images, to the image data and uses resultant luminance values as those of mutually associated points on the respective images.

8. The image processing apparatus of claim 1, wherein the coefficient calculating section calculates the photometric coefficient by replacing the luminance value of a point representing each said reference corresponding point candidate on its associated image with that of at least one point located in the vicinity of the former point.

9. The image processing apparatus of claim 8, wherein the coefficient calculating section calculates the photometric coefficient by using the luminance value of at least one point, which is located in proximity of said point and of which the luminance value is different from that of said point by no more than a predetermined magnitude.

10. The image processing apparatus of claim 8, wherein if the difference between the luminance value of said point and that of a proximate point located around said point exceeds a predetermined range, the coefficient calculating section calculates the photometric coefficient using the luminance value of at least one point that is located in the vicinity of said point.

11. The image processing apparatus of claim 1, further comprising:
a coordinate transformation section for generating a set of coordinate transformed images by magnifying at least one of the N images at a predetermined zoom ratio and by mapping, as pixel values of the magnified image, respective pixel values of at least k images (where k is an integer and $3 \leqq k \leqq N$) among the N images according to the predetermined zoom ratio; and
an image generating section, which selects k coordinate transformed images from those coordinate transformed images, calculates a transform coefficient as a coefficient for the photometric constraint equation such that the luminance values of points on the respective coordinate transformed images, which are associated with each other between the k coordinate transformed images, satisfy the photometric constraint equation, and linearly combines the N coordinate transformed images with the transform coefficient, thereby generating a synthetic image.

12. The image processing apparatus of claim 11, wherein the image generating section selects the k coordinate transformed images according to the magnitude of a subject area ratio, which is defined as the ratio of the area of a subject in any of the coordinate transformed images to that of the same subject in its original one yet to be transformed.

13. An image processing method comprising the steps of:
using a processor, computing, based on image data representing a number N of images, n sets of initial corresponding points across the N images, where N and n are both integers, $N \geqq 4$ and $n \geqq 4$;
selecting s sets of initial corresponding points from the n sets of initial corresponding points, where s is an integer and $4 \leqq s \leqq n$;
making M groups of reference corresponding point candidates such that each of the M groups is made up of s sets of initial corresponding points, where M is an integer and $M \geqq 2$;
calculating a photometric coefficient as a coefficient for a photometric constraint equation such that in each of the M groups of reference corresponding point candidates, luminance values of respective points on the images satisfy the photometric constraint equation;
generating multiple sets of aimed corresponding point candidates, each said set being comprised of new corresponding points that are associated with each other between the images, such that each of the M groups of reference corresponding point candidates satisfies a geometric constraint equation that is defined for that group between the images;
estimating, based on the luminance values of the respective points on the images and the photometric coefficient calculated, how much those sets of aimed corresponding point candidates satisfy the photometric constraint equation;
selecting a single set of aimed corresponding point candidates based on a result of the estimation and outputting the set as aimed corresponding points;
evaluating the M groups of reference corresponding point candidates based on the result of the estimation, and selecting a single set of reference corresponding point candidates from the M groups based on a result of the evaluation; and
outputting the selected single set of reference corresponding point candidates and aimed corresponding points associated with the selected candidates as corresponding points across the N images.

14. A non-transitory storage medium on which a computer program is stored, the computer program being defined so as to make a computer perform the steps of:

computing, based on image data representing a number N of images, n sets of initial corresponding points across the N images, where N and n are both integers, $N \geq 4$ and $n \geq 4$;

making M groups of reference corresponding point candidates such that each of the M groups is made up of s sets of initial corresponding points across the N images, where M and s are both integers, $M \geq 2$ and $4 \leq s \leq n$;

calculating coefficient as a coefficient for a photometric constraint equation such that in each of the M groups of reference corresponding point candidates, luminance values of respective points on the images satisfy the photometric constraint equation;

generating multiple sets of aimed corresponding point candidates, each said set being comprised of new corresponding points that are associated with each other between the images, such that each of the M groups of reference corresponding point candidates satisfies a geometric constraint equation that is defined for that group between the images;

estimating, based on the luminance values of the respective points on the images and the photometric coefficient calculated, how much those sets of aimed corresponding point candidates satisfy the photometric constraint equation;

selecting a single set of aimed corresponding point candidates based on a result of the estimation and outputting the set as aimed corresponding points;

evaluating the M groups of reference corresponding point candidates based on the result of the estimation, and selecting a single set of reference corresponding point candidates from the M groups based on a result of the evaluation; and outputting the selected single set of reference corresponding point candidates and aimed corresponding points associated with the selected candidates as corresponding points across the N images.

15. A processor having the ability to execute a computer program, wherein by executing an image processing program, the processor performs the steps of:

the processor computing, based on image data representing a number N of images, n sets of initial corresponding points across the N images, where N and n are both integers, $N \geq 4$ and $n \geq 4$;

making M groups of reference corresponding point candidates such that each of the M groups is made up of s sets of initial corresponding points across the N images, where M is an integer and $M \geq 2$;

calculating a photometric coefficient as a coefficient for a photometric constraint equation such that in each of the M groups of reference corresponding point candidates, luminance values of respective points on the images, which are associated with each other between the images, satisfy the photometric constraint equation;

generating multiple sets of aimed corresponding point candidates, each said set being comprised of new corresponding points that are associated with each other between the images, such that each of the M groups of reference corresponding point candidates satisfies a geometric constraint equation that is defined for that group between the images;

estimating, based on the luminance values of the respective points on the images, which are associated with each other between the images, and the photometric coefficient calculated, how much those sets of aimed corresponding point candidates satisfy the photometric constraint equation;

selecting a single set of aimed corresponding point candidates based on a result of the estimation and outputting the set as aimed corresponding points;

evaluating the M groups of reference corresponding point candidates based on the result of the estimation, and selecting a single set of reference corresponding point candidates from the M groups based on a result of the evaluation; and outputting the selected single set of reference corresponding point candidates and aimed corresponding points associated with the selected candidates as corresponding points across the N images.

16. An image processing apparatus comprising:

an initial corresponding point computing section for computing, based on image data representing a number N of images, n sets of initial corresponding points across the N images, where N and n are both integers, $N \geq 4$ and $n \geq 4$; and a corresponding point recomputing section, which selects s sets (where s is an integer and $4 \leq s \leq n$) of initial corresponding points, which satisfy a geometric constraint equation and a photometric constraint equation, from the n sets of initial corresponding points and outputs the s sets as reference corresponding points and which computes, based on the reference corresponding points, aimed corresponding points that satisfy the geometric and photometric constraint equations and outputs the aimed corresponding points.

* * * * *